United States Patent
Chang et al.

(10) Patent No.: US 11,973,303 B2
(45) Date of Patent: Apr. 30, 2024

(54) LASER APPARATUS HAVING MULTIPLE-PASS ELECTRO-OPTIC MODULATORS

(71) Applicant: Panasonic Intellectual Property Management Co., Ltd., Osaka (JP)

(72) Inventors: Liang Chang, Acton, MA (US); Fangqin Li, Acton, MA (US); Riccardo Leto, Arlington, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 494 days.

(21) Appl. No.: 17/360,359

(22) Filed: Jun. 28, 2021

(65) Prior Publication Data

US 2022/0416497 A1 Dec. 29, 2022

(51) Int. Cl.
*G02F 1/03* (2006.01)
*H01S 3/115* (2006.01)

(52) U.S. Cl.
CPC ............ *H01S 3/115* (2013.01); *G02F 1/0311* (2013.01); *G02F 1/0322* (2013.01)

(58) Field of Classification Search
CPC .... G02F 1/0311; G02F 1/0322; G02F 1/0316; G02F 1/0327
See application file for complete search history.

(56) References Cited

U.S. PATENT DOCUMENTS 7,830,581 B2    11/2010   Zadoyan et al.
9,429,777 B2 *   8/2016   Von Elm ............... G02F 1/0018

OTHER PUBLICATIONS

Detlef Nickel et al., "200 kHz electro-optic switch for ultrafast laser systems", Review of Scientific Instruments, 2005, pp. 033111-1 to 033111-7, vol. 76.
"Pockels Cells", A catalog of Eksma Optics, 2015, pp. 3.1-3.19.
M. Nantel et al., "Temporal Contrast in Ti:Sapphire Lasers: Characterization and Control", IEEE Journal of Selected Topics in Quantum Electronics, vol. 4, No. 2, pp. 449-458, Mar.-Apr. 1998, doi: 10.1109/2944.686755.

* cited by examiner

*Primary Examiner* — Joseph P Martinez
(74) *Attorney, Agent, or Firm* — PEARNE & GORDON LLP

(57) ABSTRACT

A laser apparatus includes at least one electro-optic (EO) medium through which a polarized laser beam passes for N times, forming a plurality of first-pass to Nth-pass beams, by reflecting the polarized laser beam from at least one reflection mirror, and a power supplier configured to alternately provide a 1/N of a half-wave ($\lambda/2$) or quarter-wave ($\lambda/4$) voltage and remove the voltage to the EO medium, $\lambda$ being a wavelength of the polarized laser beam. The at least one EO medium is tilted at angle $\theta$ and/or angle $\phi$ with respect to one of the plurality of first-pass to Nth-pass beams. The at least one EO medium comprises a M number of EO mediums, and the power supplier is configured to alternately provide a 1/M*N of a half-wave ($\lambda/2$) or quarter-wave ($\lambda/4$) voltage and remove the voltage to each of the M number of EO mediums.

24 Claims, 33 Drawing Sheets

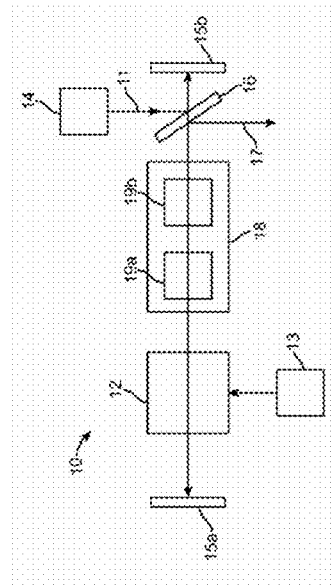
Fig. 1B
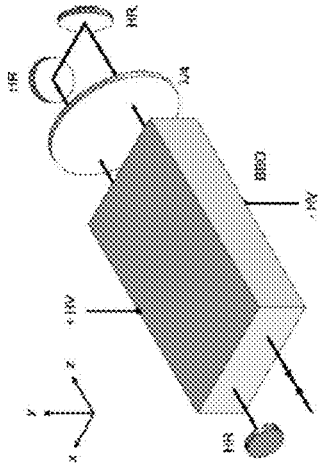
Fig. 1D -Prior Art-
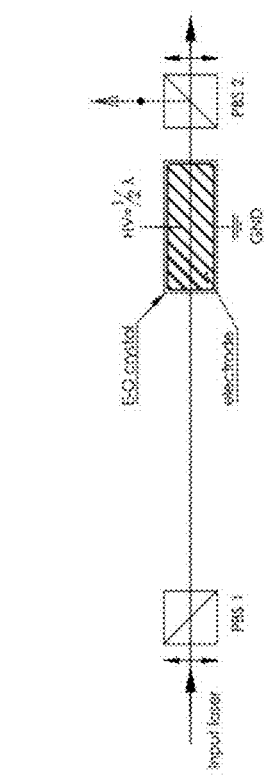
Fig. 1A -Prior Art-
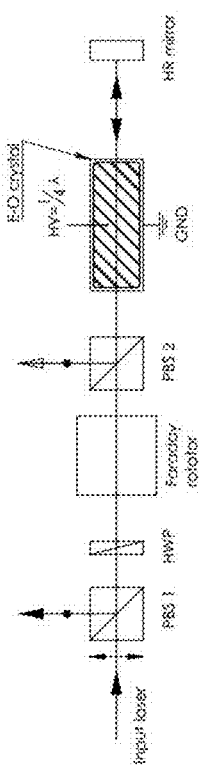
Fig. 1C -Prior Art-

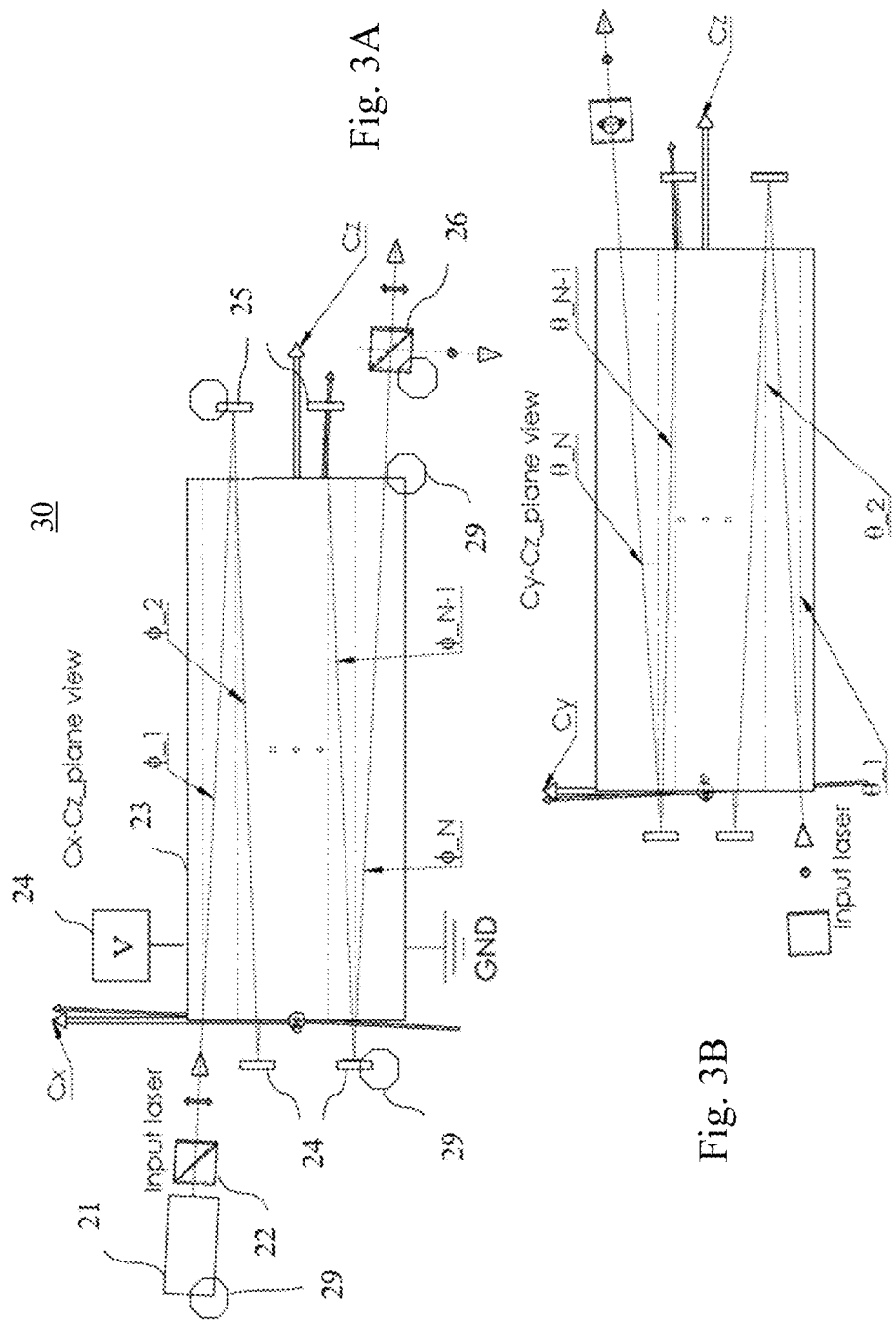

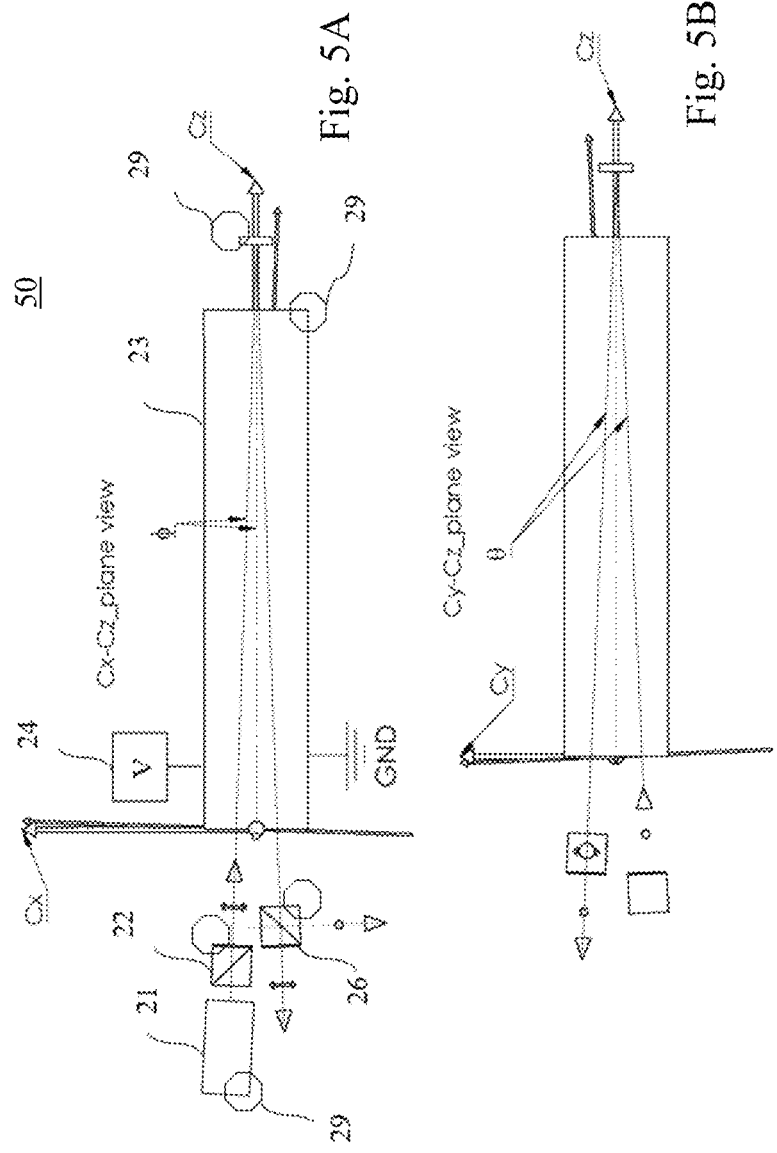

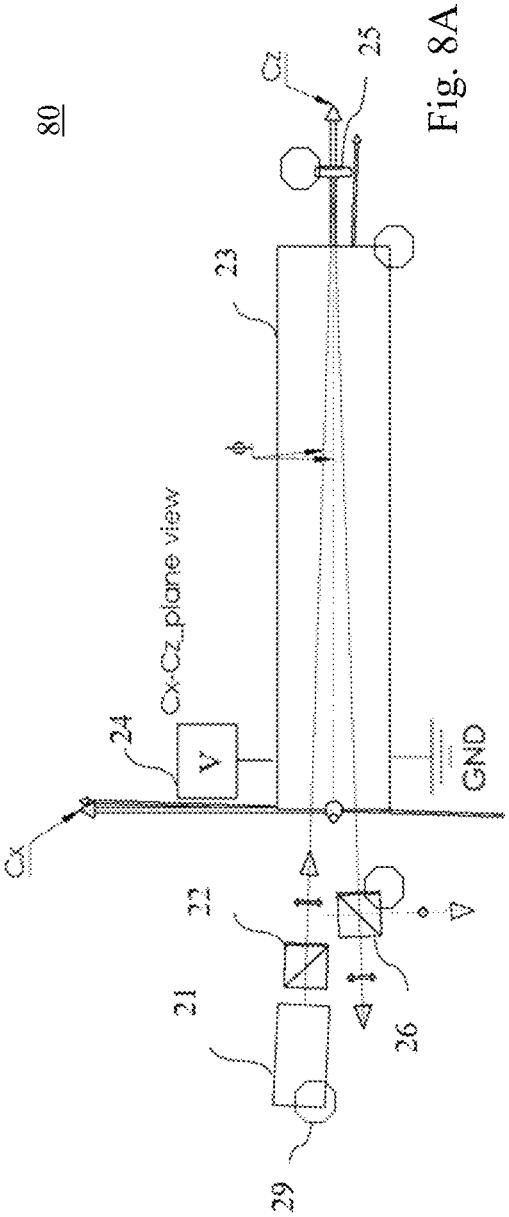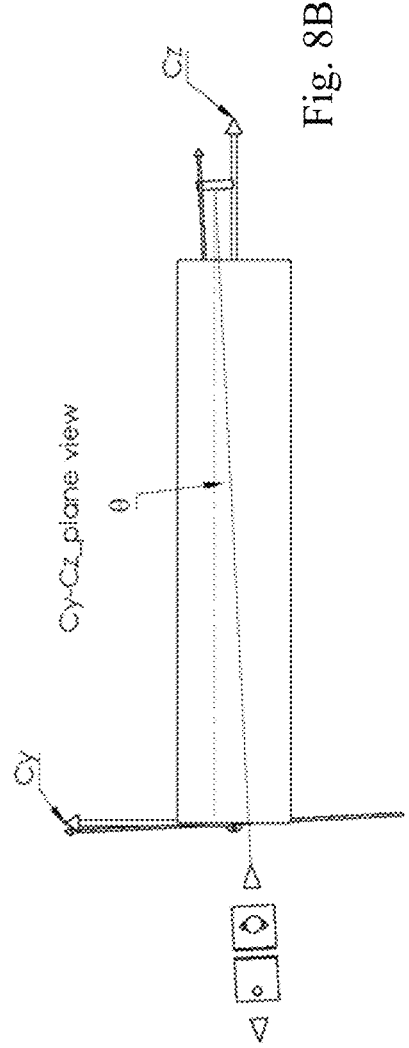
Fig. 8A
Fig. 8B

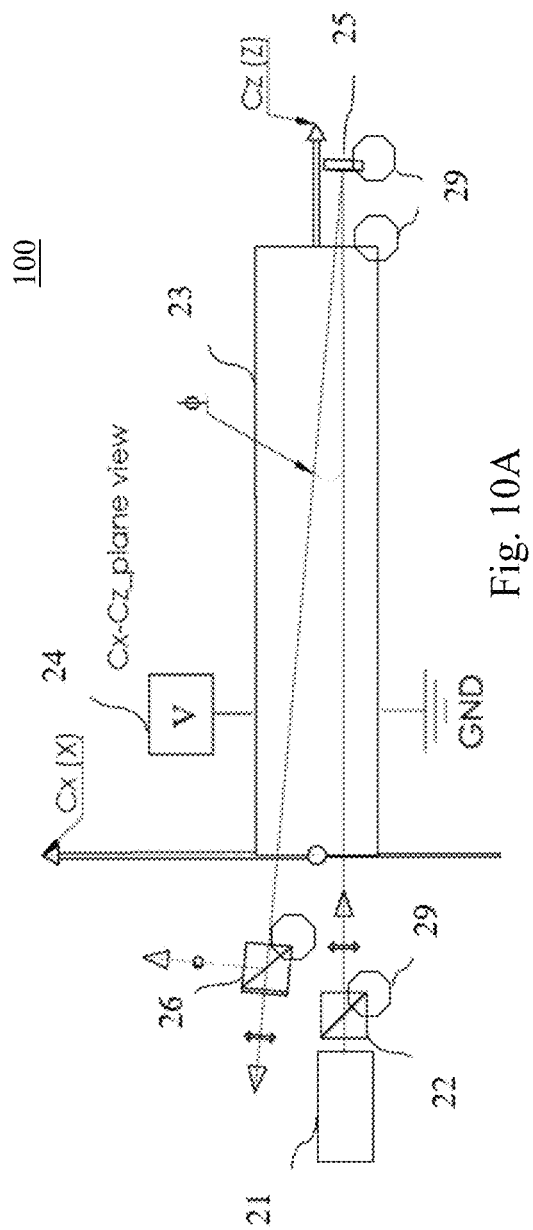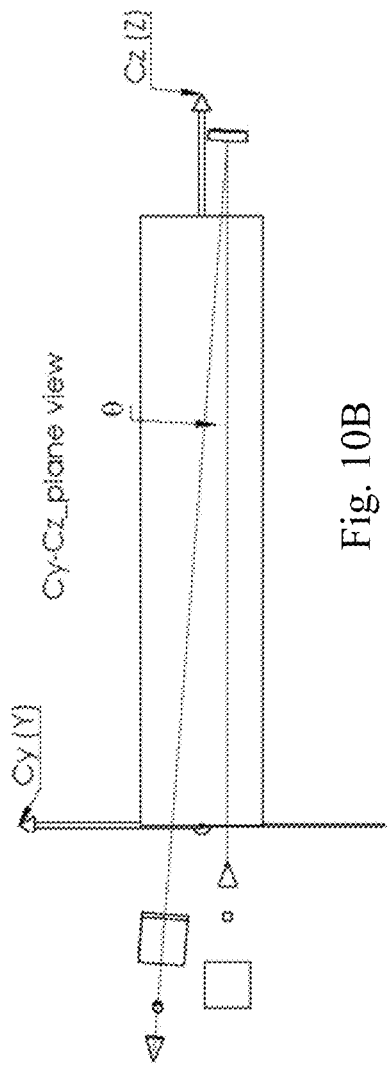
Fig. 10A
Fig. 10B

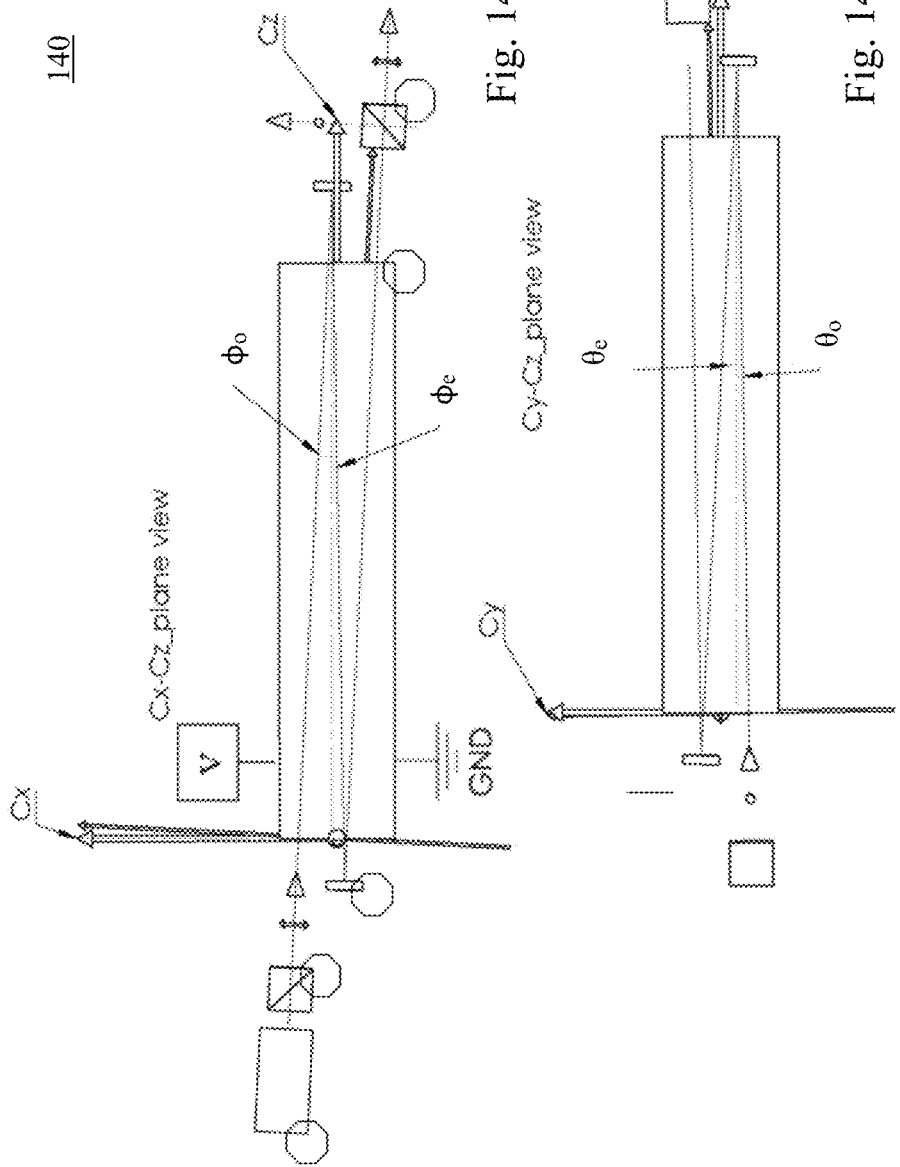

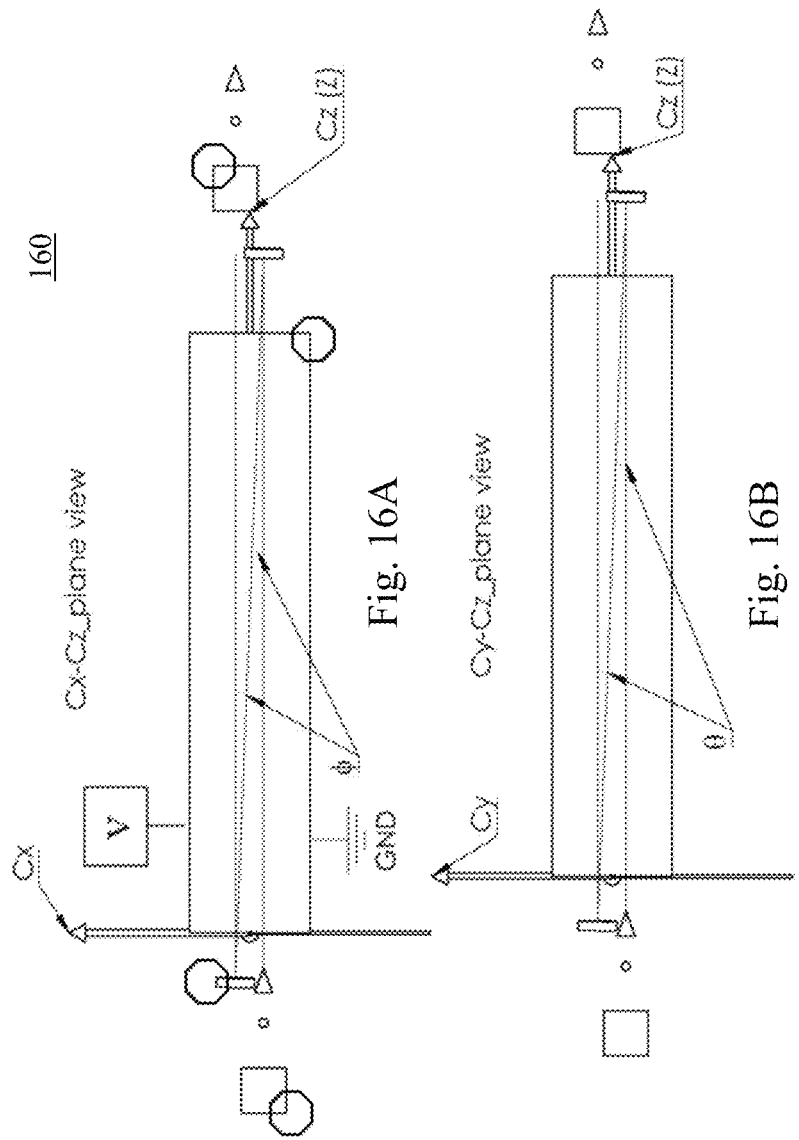

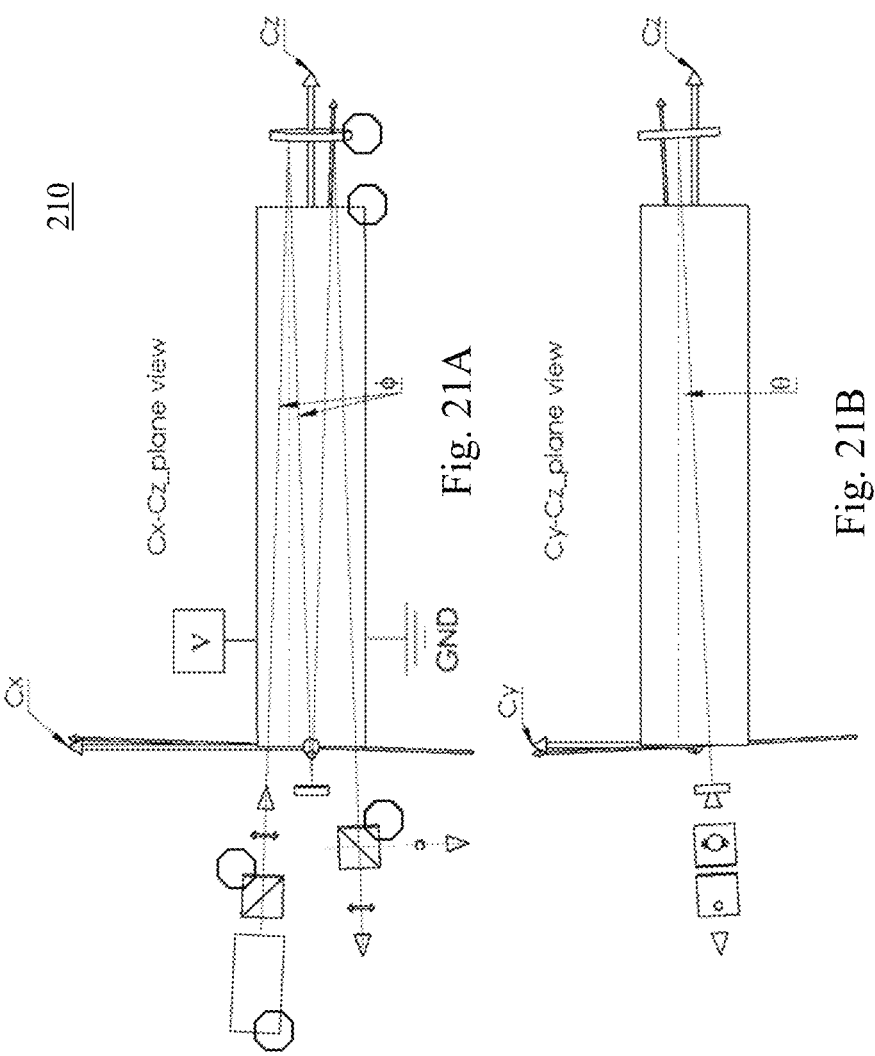

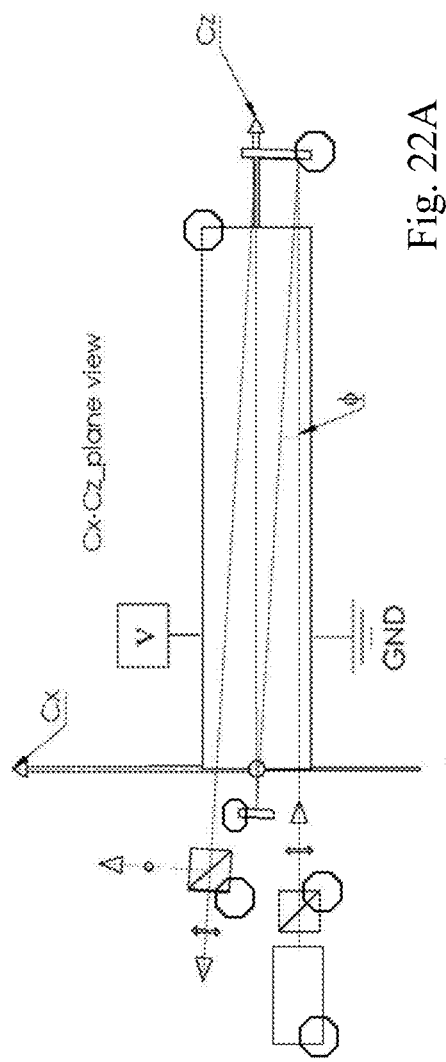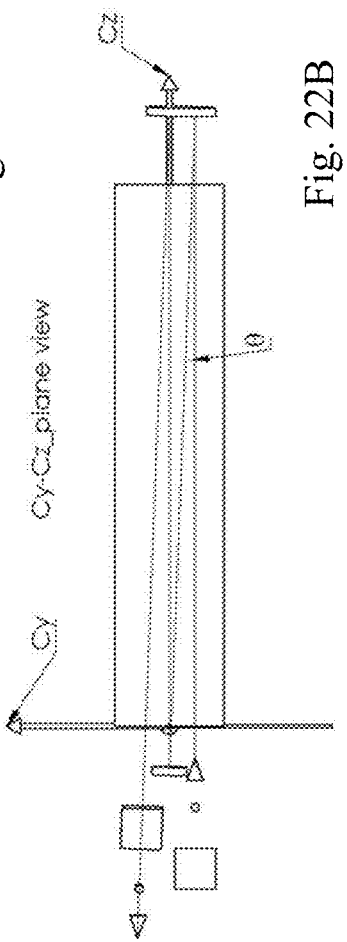
Fig. 22A
Fig. 22B

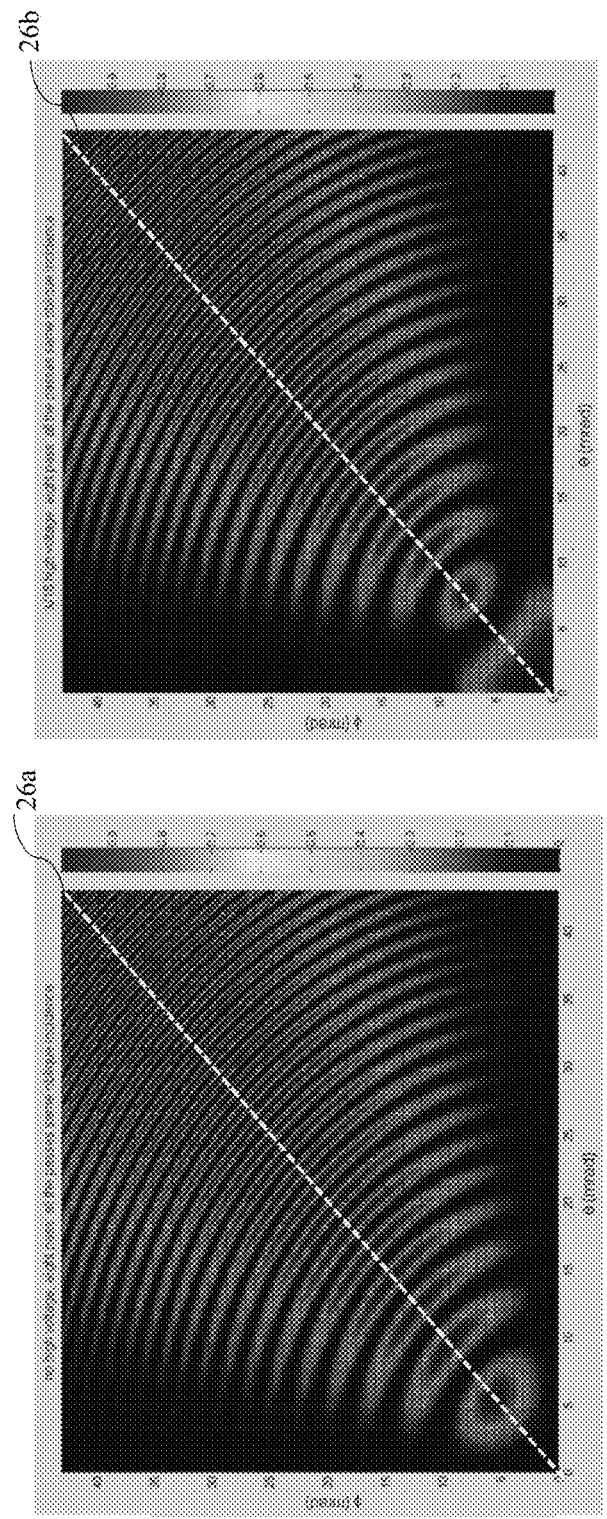
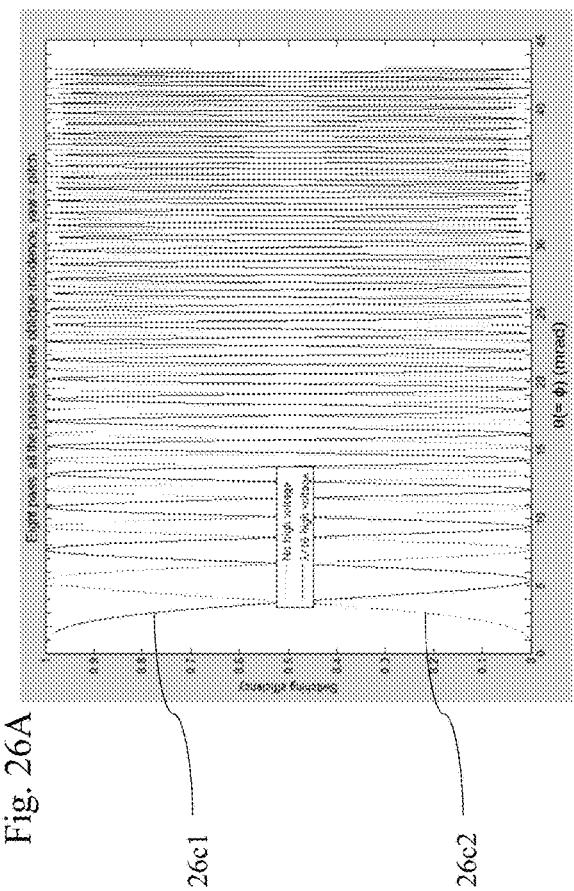
Fig. 26A
Fig. 26B
Fig. 26C

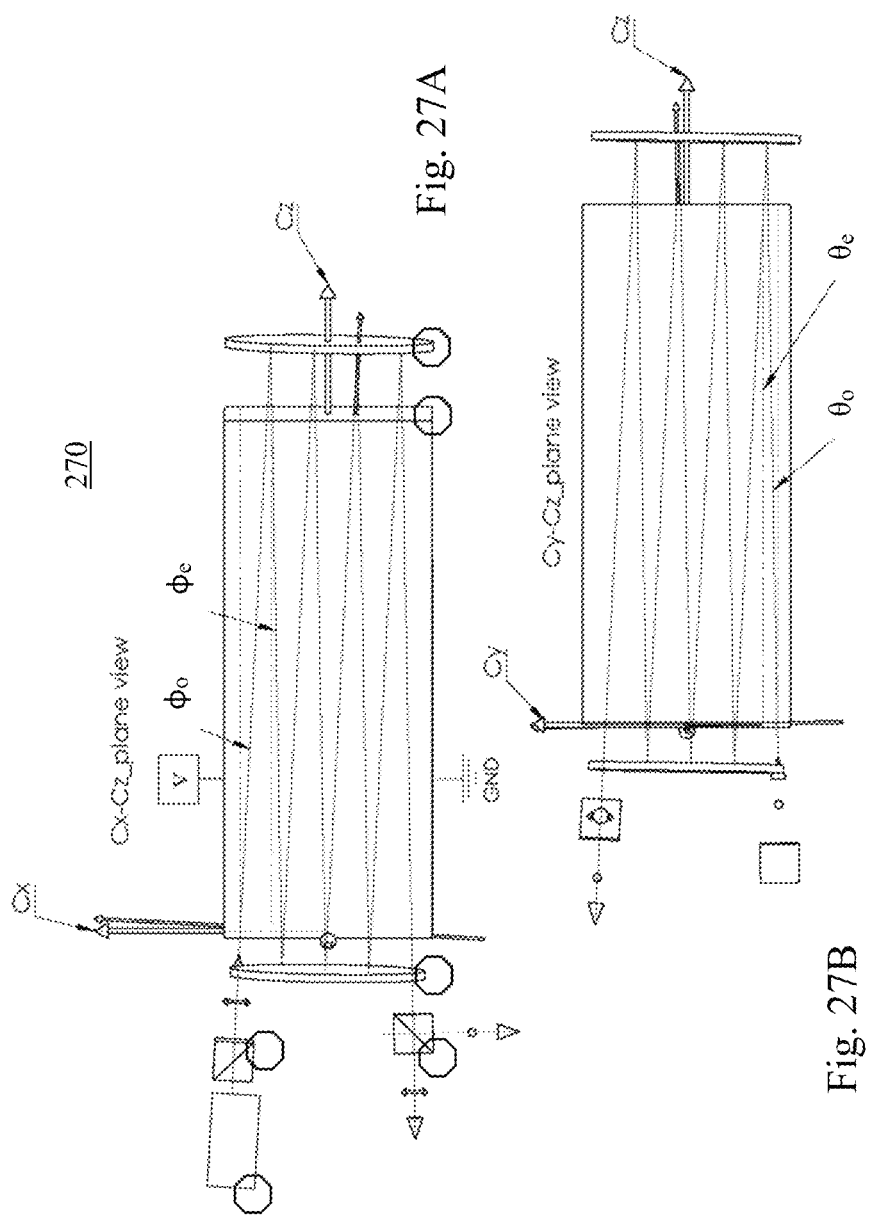

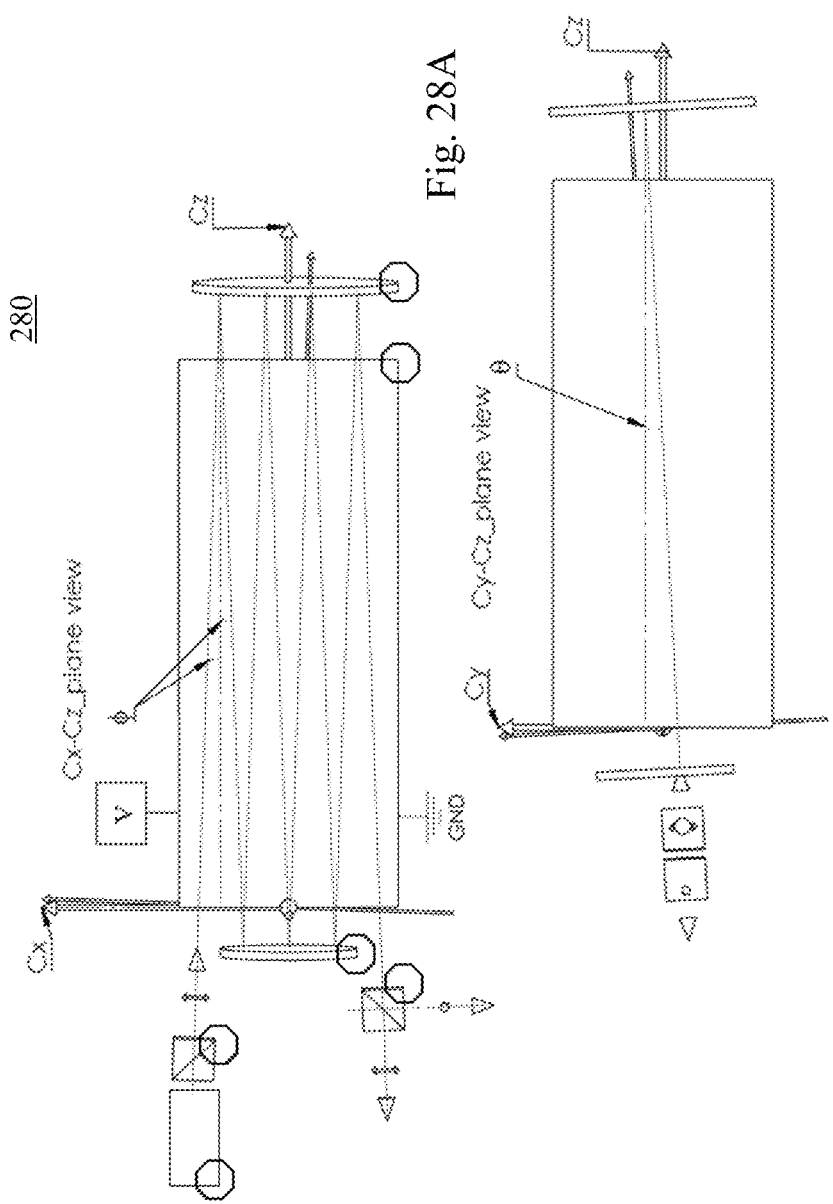

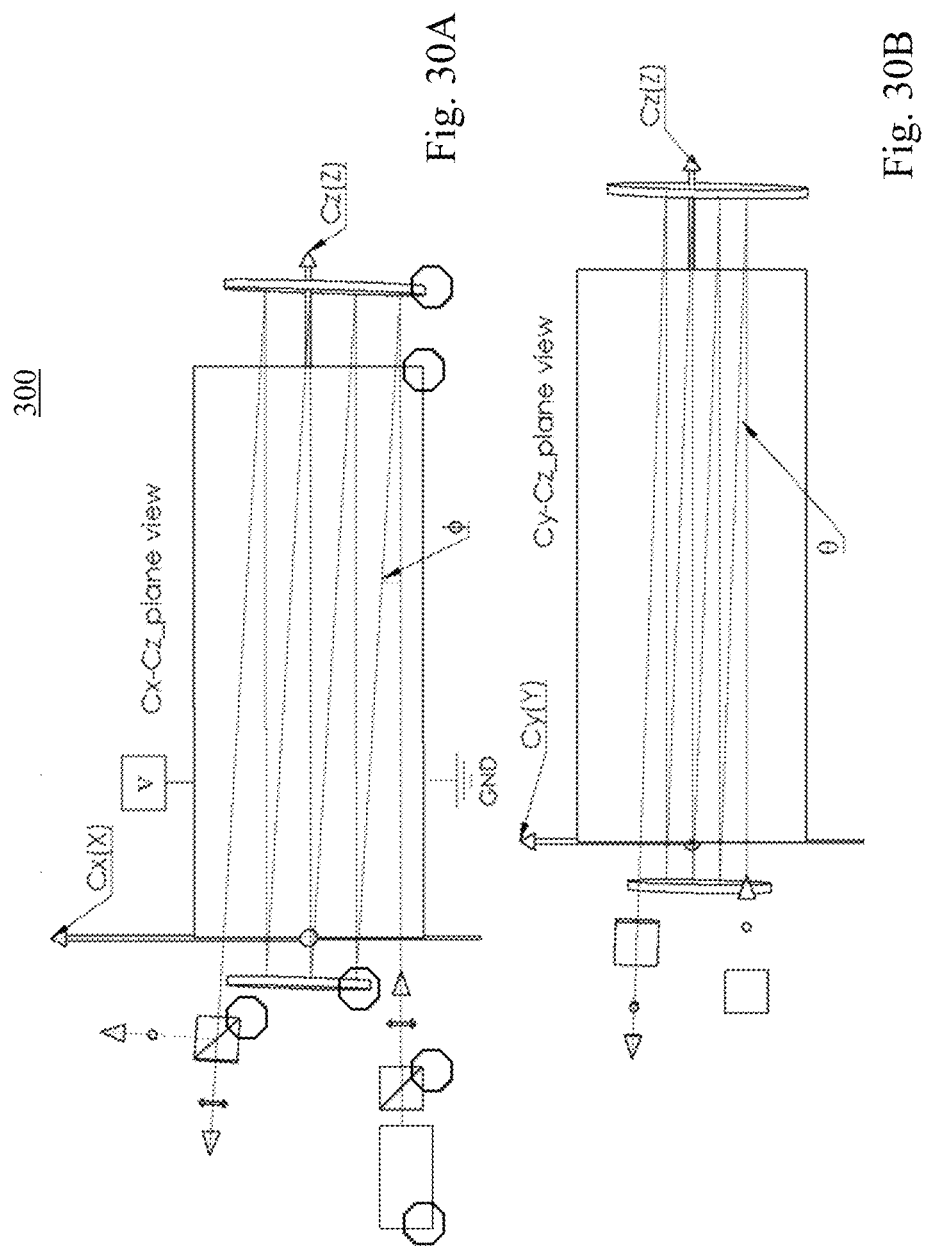

LASER APPARATUS HAVING MULTIPLE-PASS ELECTRO-OPTIC MODULATORS

TECHNICAL FIELD

The present disclosure relates to a laser apparatus having a multiple-pass electro-optic modulator for pulse picking/Q-switching.

BACKGROUND

Ultrafast lasers, such as picosecond and femtosecond lasers are widely used in laser micromachining and medical applications, such as glass cutting, solar cell manufacturing, myopia and cataract surgery, etc. These applications benefit from the ultrashort pulse width and high peak power of ultrafast lasers, which can reduce the heat-affected zone and realize higher processing quality.

The ultrafast laser pulses are generated by the mode locking technology. As the frequency of the pulses directly obtained by a mode locking is usually within tens of megahertz, the pulse energy is only picojoule or nanojoule level, far below the application requirement. In order to increase the pulse energy, the frequency must be reduced to kHz or MHz range using a pulse picker, then the selected pulse (seed) is injected into a multi-pass amplifier or regenerative amplifier to amplify the pulse energy $10^3$~$10^9$ times. An additional pulse picker is required behind the amplifier if the application needs to fast modulate the energy and change the frequency of the laser pulses. Such a pulse picker can be acousto-optic modulators (AOM) or electro-optic modulators (EOM), both AOM and EOM have their pros and cons.

The AOM uses the acousto-optic (A-O) effect to diffract and deflect the laser. The advantage of the AOM is low power consumption and low cost. The disadvantage of the AOM is that it needs a long beam path (0.5~1 m) to separate the 1st order diffracted beam from the 0th order non diffracted beam, and the diffraction efficiency of AOM is sensitive to the laser beam incident angle, spot size and divergence angle, the optimized diffraction efficiency is usually about 90%. The switching time is also proportional to beam diameter, for a 1 mm diameter beam, the switching time is about 100 ns, which is not fast enough for seed laser pulse picking. One can get faster switching time by focusing the laser into the AOM, but the diffracted laser beam profile will be distorted from round to elliptical.

As illustrated in FIG. 1A, the EOM, typically containing Pockels cells and polarization-sensitive optical components, uses the electro-optic (EO) effect (also called the Pockels effect) to modulate the laser polarization and pick/switch the pulse in conjunction with a polarizing beam splitter (PBS)/polarizer. Compared with the AOM, the switching speed of the EOM is much faster, less than 10 ns and not beam size dependent, which is fast enough for pulse picking/switching of both seed laser and amplified laser and independent of the laser beam diameter. Because the picked and remaining laser pulses have orthogonal polarizations, which are separated by a PBS/polarizer, there is no need for a long beam path as in the AOM, and the switching efficiency is close to 100%, which is usually limited by the polarization-sensitive optical components.

However, a Pockels cell needs a high voltage (up to several kilovolts) to induce 90° laser polarization rotation, which makes a high requirement of the Pockels cell driver. This high voltage is known as a half-wave voltage. Moreover, the combination of a high voltage and a high repetition rate leads to power dissipation that may exceed the power handling capabilities of available electronic components. These issues make it difficult and expensive to use EOM in industry applications.

The half-wave voltage for an EO medium depends on the material and crystal dimensions. For Pockels cells based on an EO crystal such as BBO (Beta Barium Borate), RTP (Rubidium Titanyl Phosphate), KTP (Potassium Titanyl Phosphate) and $LiNO_3$ (Lithium Nitrate) with a transverse electric field, the half-wave voltage is proportional to the ratio of an aperture to a length of the EO crystal. One possibility to reduce the voltage is to reduce the crystal aperture, in this case, the laser beam should be focused tight inside the crystal, but the nonlinear effects in high peak power ultrafast lasers will disable this approach, even cause crystal damage. Another way is to increase the crystal length; however, the typical length of commercially available crystals is limited by the crystal growth technology.

For Pockels cells based on EO crystal such as KD*P (Potassium dideuterium phosphate) and KDP (Potassium dihydrogen phosphate) with a longitudinal electric field, the required half-wave voltage is independent of a crystal length and varies only weakly with an aperture size.

Currently, to reduce the voltage, one method disclosed in U.S. Pat. No. 7,830,581 titled as Method and System for Laser Amplification Using a Dual Crystal Pockels Cell is to place two Pockels cell crystals in series driven from a common voltage source as illustrated in FIG. 1B, each Pockels cell needs a half of the original half-wave voltage (called a quarter-wave voltage). This not only increases the difficulty of assembling the Pockels cells, but also the cost due to the increased number of crystals.

The second method as illustrated in FIG. 1C is to let the laser pass through the Pockels cell twice, where the first-pass beam and the second-pass beam are strictly coaxial with the optical axis of the crystal, to avoid laser feedback, an expensive optical isolator and a half-wave plate needed to be placed between the laser source and the Pockels cell. These elements will increase the cost, furthermore, the absorption of the isolator crystal will cause a laser beam distortion especially at high power (>200 W).

In the third method as illustrated in FIG. 1D, the laser passes through the Pockels cell along the optical axis of the EO crystal four times (Review of Scientific Instruments 76, 033111 (2005) 200 kHz electro-optic switch for ultrafast laser systems), after the first-pass beam through the crystal, the laser beam is reflected by two 45° dielectric high reflective mirrors (act as a 90° retroreflector). The second-pass beam has to be precisely adjusted parallel to the first-pass beam. After the second-pass beam, a dielectric high reflective mirror reflects the beam in the opposite direction, thereby allowing a total of four beam to pass through the crystal. The layout of this method is very complicated, and an additional quarter-wave plate has to be used to compensate for the phase retardation introduced by the 45° mirrors. This method also needs an optical isolator and half-wave plate to avoid laser feedback.

U.S. Pat. No. 9,429,777 B2 (777) titled as Electro-optic modulator adopts a complicated layout to let the laser pass through the Pockels cell twice, with the first-pass beam along the optical axis of the crystal, the second reverse pass slightly deviating (about 8 mrad angle) from the optical axis. An yttrium vanadate crystal and an isosceles right-angled prism were placed between the laser source and Pockels cell. Their purpose of introducing the small angle is to achieve high switching efficiency by introducing polarization-dependent laser beam paths and physically separating the picked and non-picked pulses. However, this deviation angle also introduces laser depolarization in their laser beam layout. Therefore, their deviation angle must be just sufficient to prevent the reverse pass beam from being fed back into the laser without introducing significant depolarization of the beam due to the misalignment of the second-pass beam from the optical pass of the EO crystal. Most important, '777 does not provide any method to reduce the high voltage.

There are many difficulties to make a Pockels cell driver that can provide high voltage at high pulse frequency. The dramatic reduction of the high voltage can enable wide use of the current Pockels cell driver in practical applications.

SUMMARY

The present disclosure provides apparatus for reducing the required high voltage of an electro-optic modulator (EOM) with multiple-pass geometry for laser pulse picking/Q-switching applications.

In one aspect, a laser apparatus includes a laser polarizer configured to output a polarized laser beam, at least one electro-optic (EO) medium through which the polarized laser beam passes for N times, forming a plurality of first-pass to Nth-pass beams, by reflecting the polarized laser beam from at least one reflection mirror, and a power supplier configured to alternately provide a 1/N of a half-wave ($\lambda/2$) or quarter-wave ($\lambda/4$) voltage with a tolerance of up to 10 percent and remove the 1/N of the half-wave or quarter-wave voltage to the EO medium, $\lambda$ being a wavelength of the polarized laser beam.

The EO medium may be tilted at a yaw angle and/or a pitch angle with respect to one of the plurality of first-pass to Nth-pass beams. That is, at least one pass of the polarized laser beam passes through the EO medium at a non-zero angle with respect to an optical axis of the EO medium that is generally aligned (not transverse) with the direction of the laser beam. The yaw angle can be a non-zero angle or the pitch angle can be a non-zero angle or both the yaw angle and the pitch angle can be non-zero. An optical axis of the EO medium being tilted with respect to a beam may be effected by tilting the EO medium, tilting the beam, or tilting both the EO medium and the beam.

In another embodiment, even-pass beams are along with respect to an optical axis of Pockels cell, and odd-pass beams deviate with respect to an optical axis of the at least one Pockels cell, or even-pass beams deviate with respect to an optical axis of Pockels cell, and odd-pass beams are along with respect to an optical axis of the at least one Pockels cell.

In yet another embodiment, even-pass beams and odd-pass beams are symmetric to each other with respect to a pitch plane of the Pockels cell.

In addition, the at least one EO medium comprises a M number of EO mediums, and the power supplier is configured to alternately provide a 1/M*N of a half-wave ($\lambda/2$) or quarter-wave ($\lambda/4$) voltage and remove the voltage to each of the M number of EO mediums.

In another aspect, a method for operating a laser apparatus comprises entering, from a laser polarizer, a polarized laser beam to at least one electro-optic (EO) medium through which the polarized laser passes, and reflecting, by high reflection (HR) coated mirror(s), the polarized laser beam so that the beam passes through the EO medium for N times, forming a plurality of first-pass to Nth-pass beams, the optical axis of the EO medium being tilted with respect to at least one of the plurality of first-pass to Nth-pass beams, and alternatingly providing a 1/N of a half-wave ($\lambda/2$) or quarter-wave voltage and removing the $\lambda/2N$ voltage to the EO medium, $\lambda$ being a wavelength of the polarized laser beam.

In one embodiment, the method further comprises tilting one of the at least one EO medium, the laser polarizer, and the at least one reflection mirror with respect to the at least one of the plurality of first-pass to Nth-pass beams in yaw direction and/or a pitch direction.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A illustrates a single pass with single E-O crystal;

FIG. 1B illustrates a single pass with double E-O crystals;

FIG. 1C illustrates a double pass with optical isolator and half-wave plate;

FIG. 1D illustrates a four-pass with optical isolator, half-wave plate and additional optical component.

FIGS. 3A-3B show exemplary schematic illustrations of a laser device with a multiple-pass electro-optic modulator (EOM) 30 including an EO crystal for laser pulse picking/Q-switching according to one embodiment of the present disclosure.

FIGS. 5A-5B are schematic illustrations of double-pass EOM configuration 50 of the 1st symmetric type according to one embodiment of the present disclosure.

(FIG. 6C)

FIGS. 8A-8B are yet another schematic illustration of double-pass EOM configuration of the 3rd symmetric type according to one embodiment of the present disclosure.

FIGS. 10A-10B are yet another schematic illustration of double-pass EOM configuration 100 of the mix type according to one embodiment of the present disclosure.

FIGS. 14A-14B are yet another schematic illustration of three-pass EOM configuration 140 of the 2nd symmetric type according to one embodiment of the present disclosure. In this particular case, angle θ and angle φ have the following relations: φe=θo, and θe=φo.

FIGS. 16A-16B are yet another schematic illustration of three-pass EOM configuration 160 of the mix type according to one embodiment of the present disclosure.

FIGS. 21A-21B are yet another schematic illustration of four-pass EOM configuration 210 according to one embodiment of the present disclosure.

FIGS. 22A-22B are yet another schematic illustration of four-pass EOM configuration 220 according to one embodiment of the present disclosure.

FIGS. 26A-26C show respective spectrum graphs of switching efficiencies versus angle θ and angle φ of Pockels cell axis to laser beam for eight-pass BBO Pockels cell.

FIGS. 27A-27B are another schematic illustration of an eight-pass EOM configuration of the 2nd symmetric type according to one embodiment of the present disclosure. In this particular case, angle θ and angle φ have the following relations: φe=θo, and θe=φo.

FIGS. 28A-28B are another schematic illustration of an eight-pass EOM configuration 280 of the $3^{rd}$ symmetric type according to one embodiment of the present disclosure.

FIGS. 30A-30B are yet another schematic illustration of eighth-pass EOM configuration 300 of the mix type according to one embodiment of the present disclosure.

Throughout the drawings, it should be noted that like reference numbers are used to depict the same or similar elements, features, and structures.

DETAILED DESCRIPTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Figure 2A:
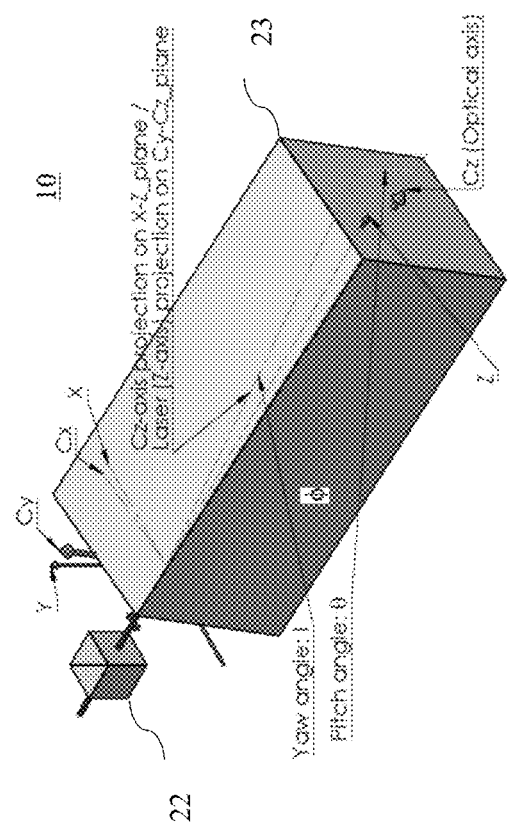
FIGS. 2A-2C show the reference coordinates applied to the drawings in the application.
Figure 2B:
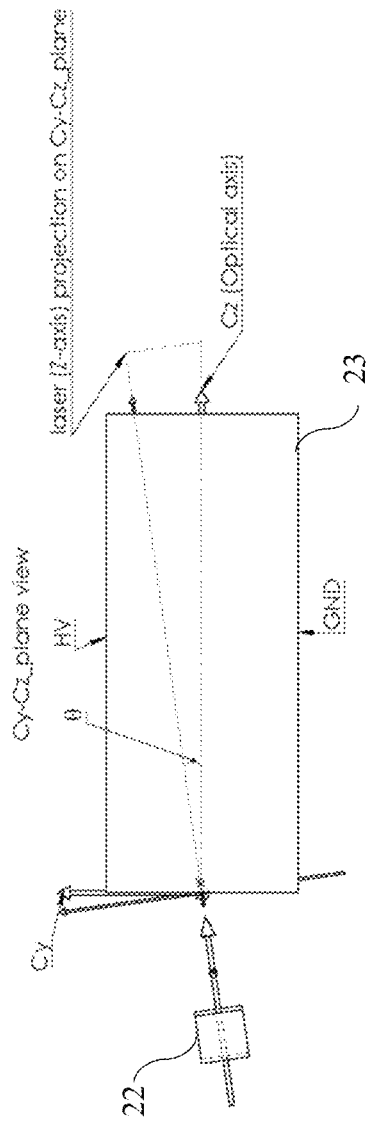
Figure 2C:
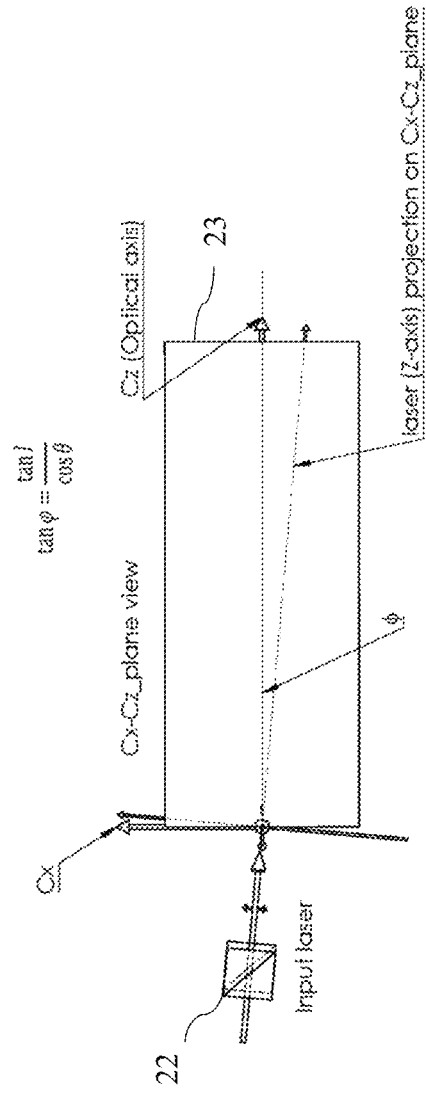

FIGS. 2A to 2C illustrate the reference coordinate applied to the drawings in the application.

As shown in FIG. 2A, EO crystal 23 has the yaw axis Cx, the pitch axis Cy, and the roll axis Cz (i.e., the optical axis). When EO crystal 23 is not tilted with respect to the inputted laser beam, Cx, Cy and Cz are aligned with X, Y and Z Cartesian coordinates. As the EO crystal 23 or the inputted laser beam is tilted so that the laser beam is slanted at a certain angle with respect to the optical axis Cz of the EO crystal, one or more of Cx, Cy, and Cz also are tilted with respect to the X, Y and Z Cartesian coordinates. That is, the EO crystal may be tilted or the laser may be tilted. The drawings show the laser aligned with the X, Y, Z coordinates, but the EO crystal could be aligned with these coordinates (or neither could be aligned with the coordinates).

As shown in FIGS. 2B and 2C, the tilting status of the EO crystal 23 or the laser beam can be expressed by two different angles, such as the first angle $\theta$ (e.g., a pitch angle) and the second angle $\phi$ (e.g., a yaw angle). The angle $\theta$ is measured between the laser beam projection on the Cy-Cz plane and the optical axis Cz as illustrated in FIG. 2B. The angle $\phi$ is measured between the laser beam projection on the Cx-Cz plane and the optical axis Cz, as illustrated in FIG. 2C.

FIGS. 3A to 3B show schematic illustrations of a laser device with a multiple-pass electro-optic modulator (EOM) 30 including an EO crystal for laser pulse picking/Q-switching according to one embodiment of the present disclosure.

FIGS. 3A and 3B are the Cx-Cz plane and Cy-Cz plane views of double-pass EOM configuration 30, respectively.

A laser beam passes through the EO medium for N times, forming a plurality of first-pass to Nth-pass beams. The number of N may be even or odd.

The EO crystal includes but not limited to BBO, KDP, KD*P or RTP Pockels cell. Multiple-pass EOM 20 includes a polarizing beam splitter or thin film polarizer (PBS/TFP) 22, Pockels cell 23, high reflective (HR) mirrors 25, 26 and polarizing beam splitter and/or a thin film polarizer (PBS/TFP) 26.

Laser generator 21 may be an external laser source, and may be not a part of the EO modulator. Laser generator 21 may include one of gas, liquid a solid state medium that generates a laser beam. The laser beam is separated into linear polarized laser beams by a PBS/TFP 22. One linearly polarized laser beam (e.g., a horizontal or vertical polarized laser beam) enters Pockels cell 23 and passes through the Pockels cell for the first-pass beam. Subsequently, the laser beam is reflected back to the Pockels cell by HR mirror 25, and passes through Pockels cell 23 for the second-pass beam. The laser beam continues to be reflected again between mirrors 25, 26 for next pass beams.

Depending on the number of repetitions of the reflections, the laser beam passes through the Pockels cell N times (N≥2, N can be 2, 3, 4, 5, 6, 7, 8 or more). The value of N is larger than 1, it can be 2, 3, 4, 5, 6, 7, 8, etc, limited by the laser beam size, the angles between the adjacent laser beams and the aperture size of the Pockels cell. After passing through Pockels cell N times, the laser beam continues to pass through PBS/TFP 26 at the angle required by PBS/TFP 26.

When voltage supplier 24 supplies a required voltage to Pockels cell 23, the polarization of the linearly polarized laser beam passing through Pockels cell 23 is changed by 90° degree or $\lambda/2$. The required voltage for 90° polarization rotation is 1/N of the half-wave ($\lambda/2$) or quarter-wave voltage ($\lambda/4$) (X is the wavelength of the laser beam).

When a half-wave ($\lambda/2$) voltage is applied to a Pockels cell, it functions equivalently to a half-wave plate. In specific, a half-wave plate rotates the linearly polarized laser to any desired orientation. The rotation angle is twice the angle ($\alpha$) between the incident polarized laser and the optical axis of the Pockels cell. For example, if $\alpha=45°$, the polarization rotation is $2\alpha=90°$.

When a quarter-wave ($\lambda/4$) voltage is applied to a Pockels cell, it functions equivalently to a quarter-wave plate. In specific, when a linearly (e.g., horizontal) polarized laser beam is inputted at 45° to the optical axis of a quarter waveplate or a Pockels cell with a quarter-wave voltage, the outputted laser beam is circularly polarized. On the other hand, when the inputted laser beam is circularly a polarized laser beam, it will be transformed into a linearly polarized laser beam. This means that a linearly polarized laser double passes through a quarter-wave plate or a Pockels cell with a quarter-wave voltage, the outputted laser beam is still polarized, but the polarization will be rotated 90°.

The half-wave or quarter-wave voltage is known as the high voltage (HV). Typically, the high voltage is in, but without limitation, a range of 1 kV to 10 kV (e.g., several kVs) depending on the different media and/or configurations of EOMs. Thus, voltage supplier 24 supplies 1/N of the half-wave voltage ($\lambda/2N$) voltage, or 1/N of the quarter-wave ($\lambda/4N$) voltage to the Pockels cell with a tolerance of 10 percent.

When a $\lambda/2N$ (half-wave) or $\lambda/4N$ (quarter-wave) high voltage is applied to the Pockels cell 23, the laser pulses are then picked/switched by a following polarization-sensitive optical component, which can be PBS/TFP 26. When the $\lambda/2N$ or $\lambda/4N$ high voltage is removed, the laser maintains the original polarization, and the laser pulse passes through PBS/TFP 26 or is reflected by the PBS/TFP.

Laser generator 21, Pockels cell 23, and high reflective (HR) mirrors 25, 26 can include motors 29 and be motorized to be tilted in angle $\theta$ (e.g., a yaw angle) and/or angle $\phi$ (e.g., a pitch angle) with respect to one of the plurality of first-pass to Nth-pass beams.

For the laser pulse picking/Q-switching, Pockels cell 23 is adjusted in yaw and/or pitch directions to accomplish the switching efficiency. Also, power supplier 24 applies a $\lambda/2N$ or $\lambda/4N$ high voltage to Pockels cell 23 while the laser beam passes through Pocket cell four times. Through the four-time passing process, the laser polarization of the laser beam is changed by 90° to be along a vertical or horizontal direction, and the laser pulse is reflected by PBS/TFP 26 or passes through PBS/TFP 26. When the $\lambda/2N$ (half-wave) or $\lambda/4N$ (quarter-wave) high voltage is removed, the laser maintains the original polarization, and the laser pulse passes through PBS/TFP or is reflected by the PBS/TFP. By alternately applying a $\lambda/2N$ or $\lambda/4N$ voltage and remove the applied voltage to Pockels cell 23, laser pulse picking/Q-switching can be easily realized by this multi-pass EOM scheme. Also, it can get rid of expensive optical isolators and complicated layouts, reduce high voltage and enable a feasible fast, simple, compact, high-efficiency and cheap way for laser pulse picking and Q-switching. The angle between adjacent passes through Pockels cell may be sufficient enough to just use a normal HR mirror to reflect the laser beam back to the Pockels cell without blocking the laser beam within a compact space, and so there is no need to worry about laser feedback, therefore, no optical isolator or no half-wave or quarter-wave plate is needed, and only polarization-sensitive optical component is needed to pick/switch the pulses.

One or more of the Pockels cell 23, laser generator 21, and high reflective (HR) mirrors 25, 26 can be tilted (relative to each other) such that the laser beam is slanted relative to an optical axis Cz in the Cx-Cz plane and/or Cy-Cz plane of the Pockels cell. The degree of being tilted can be measured in two different angles $\theta$ and $\phi$.

The laser device with a multiple-pass electro-optic modulator includes a controller to control the functions of Pockels cell 23, Pockels cell 23, and high reflective (HR) mirrors 25, 26, and power supplier 24. The controller can be implemented in hardware including one or more central processing units (CPUs), software, or a suitable combination of hardware and software.

In one embodiment, each of the even-pass beams and the odd-pass beams can be symmetric with being slanted at a same angle with respect to an optical axis of the Pockels cell for each plane, which is called the 1st symmetric type EOM in this disclosure. In this first type EOM, the angle $\theta_e$ of the even-pass beams and the angle $\theta_o$ of the odd-pass beams in a second plane may be an angle $\theta$ of the same magnitude; the angle $\phi_e$ of the even-pass beams and the angle $\phi_o$ of the odd-pass beams in a first plane may be an angle $\phi$ of the same magnitude, which is represented by the following equation:

$$\theta_o=\theta_e; \phi_o=\phi_e \qquad (1)$$

Alternatively, the angles of odd-pass beams and the angles of even-pass beams are swapped with the optical axis of the Pockels cell, which is called the 2nd symmetric type EOM in this disclosure. "Swapped" means the angle $\theta$ (e.g., the yaw angle) of the odd-pass beams equals the angle $\phi$ (e.g., the pitch angle) of the even-pass beams (and vice versa). That is, in this 2nd type EOM, the angle $\phi_o$ of the odd-pass beams in the first plane and the angles $\theta_e$ of the even-pass beam in the second plane may be the same angle; the angle $\theta_o$ of the even-pass beams in a first plane and the angles $\theta_e$ of the odd-pass beams in a second plane may be the same angle, which is represented by the following equation:

$$\theta_o=\phi_e; \phi_o=\theta_e \qquad (2)$$

Alternatively, the even-pass beams and the odd-pass beams are symmetric to each other with respect to a pitch plane of the Pockels cell, which is called the 3rd symmetric type EOM in this disclosure. In this 3rd type EOM, the minus of the angle $\theta_e$ of the even-pass beams and the angle $\theta_0$ of the odd-pass beams in a first plane may be the angle; the angle $\theta$, of the even-pass beams and the angle $\phi_o$ of the odd-pass beams in a first plane may be an angle $\phi$ of an same magnitude, which is represented by the following equation:

$$\theta_o=-\theta_e; \phi_o=\phi_e \qquad (3)$$

Alternatively, the even-pass beams can be along with respect to an optical axis of Pockels cell, and the odd-pass beams deviate with respect to an optical axis of the at least one Pockels cell; or the even-pass beams deviate with respect to an optical axis of Pockels cell, and the odd-pass beams are along with respect to an optical axis of the at least one Pockels cell, which is called the mixed type EOM in the disclosure. In this mixed type EOM, the angle $\theta_e$ of the even-pass beams in a first plane may be an angle $\theta$ of a same magnitude and the angle $\phi_e$ of the even-pass beams in a second plane may be an angle $\phi$ of a same magnitude; the angle $\theta_o$ of the odd-pass beams in the first plane and the angle $\phi_o$ of the odd-pass beams in the second plane may be zero (0), which is represented by the following equation (4):

$$\theta_o=0, \phi_o=0; \theta_e=0, \phi_e=\phi \qquad (4)$$

Figure 4:
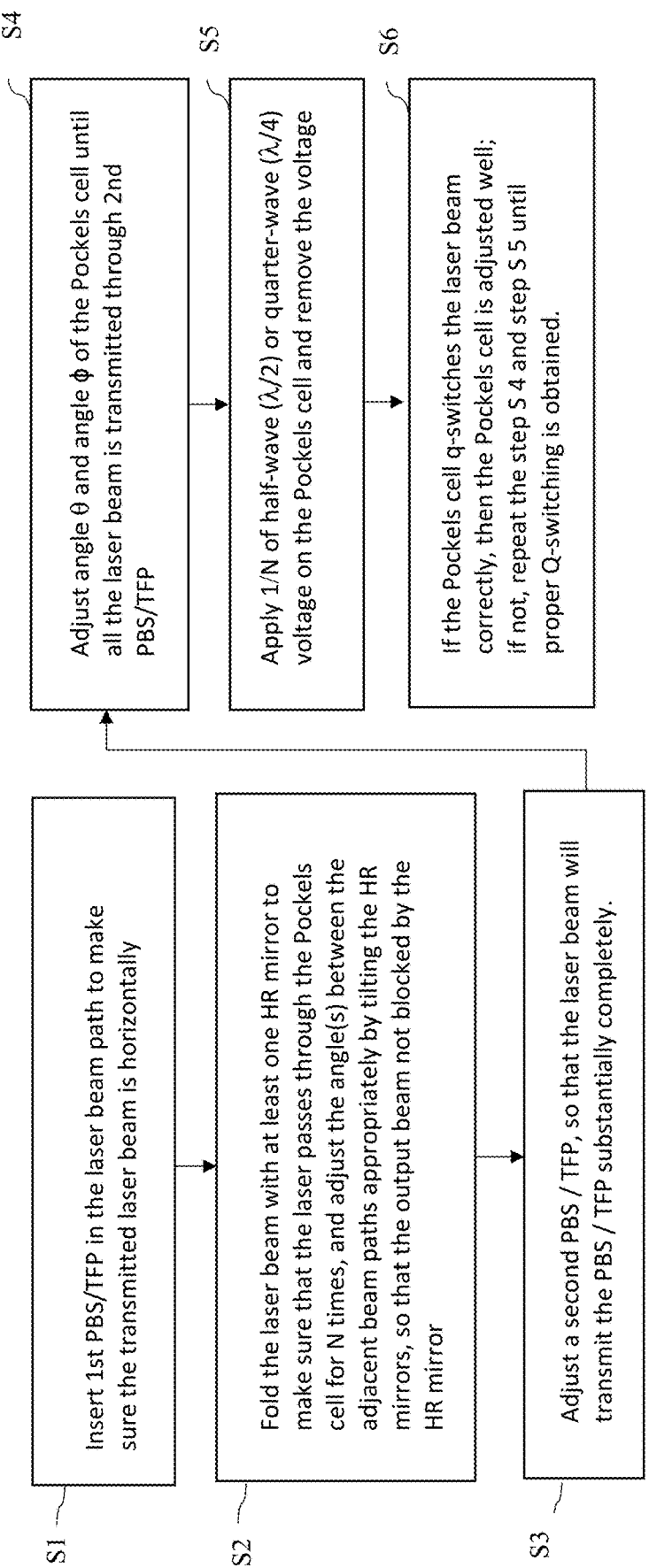
FIG. 4 shows an exemplary flowchart of a method for adjusting the angle of the laser beam for multiple-pass EOM 30 according to one embodiment of the present disclosure.

FIG. 4 shows a flowchart of a method for adjusting the angle of the laser beam for multiple-pass EOM 30 according to one embodiment of the present disclosure.

In step S1, the method inserts a 1st PBS or TFP in a laser beam path to make sure the transmitted laser beam is horizontally polarized. Here, the laser beam may be a picosecond laser with tens of MHz repetition rate.

In step S2, the laser beam is folded with at least one high-reflective (HR) mirror to make sure that the laser beam passes through the Pockels cell crystal for N times, forming a 1st-pass beam to a Nth-pass beam. The angle between the adjacent beam paths can be adjusted appropriately by tilting the HR mirrors, make sure that the output beam (i.e., the Nth-pass beam) is not blocked by the HR mirror, and insert a second PBS/TFP in the output beam path. Usually, at this time, part of the laser beam will be reflected by the 2nd PBS/TFP, part will transmit through the 2nd PBS/TFP.

In step 3, the method marks the position of the Pockels cell, then remove the Pockels cell. Then the method adjusts the second PBS/TFP so that the laser beam can transmit the 2nd PBS/TFP substantially completely. The method can put a photodiode which is connected to the oscilloscope after the transmitted beam to observe the signal, and then put the Pockels cell back into the laser beam paths.

In step 4, the method adjusts the angle $\theta$ and angle $\phi$ of the Pockels cell until substantially all the laser beam is transmitted through the 2nd PBS/TFP.

In step 5, the method applies a $\lambda/2N$ voltage on the Pockels cell to observe the signal on the oscilloscope.

In step 6, if the Pockels cell q-switches the laser beam correctly, then the Pockels cell is adjusted well; if not, the method repeats the steps 4 and 5 until a desired q-switching is obtained.

FIGS. 5A-5B are schematic illustrations of double-pass EOM configuration 50 of the 1st symmetric type according to one embodiment of the present disclosure. FIGS. 5A and 5B are the Cx-Cz plane and Cy-Cz plane views of double-pass EOM configuration 50, respectively.

As shown in FIGS. 5A-5B, a horizontal or vertical polarized laser beam is generated in PBS/TFP 22 and enters Pockels cell 23 from the first-pass beam, which is reflected back to Pockels cell 23 by HR mirror 25 for the second-pass beam. The second-pass laser beam continues to pass through PBS/TFP 26 at the angle required by PBS/TFP 26.

In the embodiment, the first-pass beam and the second-pass beam are symmetric with respect to the optical axis Cz. The first-pass beam and the second-pass beam pass are slanted at the angle $\phi$ with respect to the optical axis Cz on the Cx-Cz plane, as illustrated in FIG. 5A. Also, the first-pass beam and the second-pass beam pass are slanted at the angle $\theta$ with respect to the optical axis Cz on Cy-Cz plane, as illustrated in FIG. 5B.

Power supplier 24 applies $\lambda/4$ (half-wave) or $\lambda/8$ (quarter-wave) high voltage to Pockels cell 23, and Pockels cell 23 is adjusted along the yaw and' pitch directions. After passing Pockels cell 23 for two times, the laser polarization of the laser beam is changed by 90° degree to be along a vertical or horizontal direction, and then the laser beam is reflected by PBS/TFP 26 or passes through PBS/TFP 26, which is defined that the EOM has 100% switching efficiency. On other hand, when the λ/4 or λ/8 voltage is removed, the laser beam maintains the original polarization, and the laser pulse is transmitted through/is reflected by the PBS/TFP 26, which is defined that the EOM has zero switching efficiency.

Depending on the set-up in the embodiments, the inverse polarization is also possible such that no polarization is made with a λ/4 or λ/8 voltage applied, while 90° polarization is made with the applied voltage removed.

The first-pass beam and the second-pass beam are slanted at the same angle (a) (that is, the angles have the same magnitude) with respect to the optical axis 27 of Pockels cell 23, thus the first-pass beam and the second-pass beam become symmetric with respect to the x-y plane. The angle between the first-pass beam and the second-pass beam is sufficient to separate the input laser and the reflected back laser without an optical isolator, or a half-wave or quarter-wave plate.

The laser pulse picking/Q-switching of the double-pass EOM is calculated for various angle θ and angle φ with respect to the optical axis 27 of the Pockels cell axis. To accomplish pulse picking/Q-switching, the switching efficiency needs to be 100% or 0% when the required voltage is applied to the Pockels cell, and at the same time, the switching efficiency needs to be 0% or 100% when no voltage is applied.

Figure 6A:
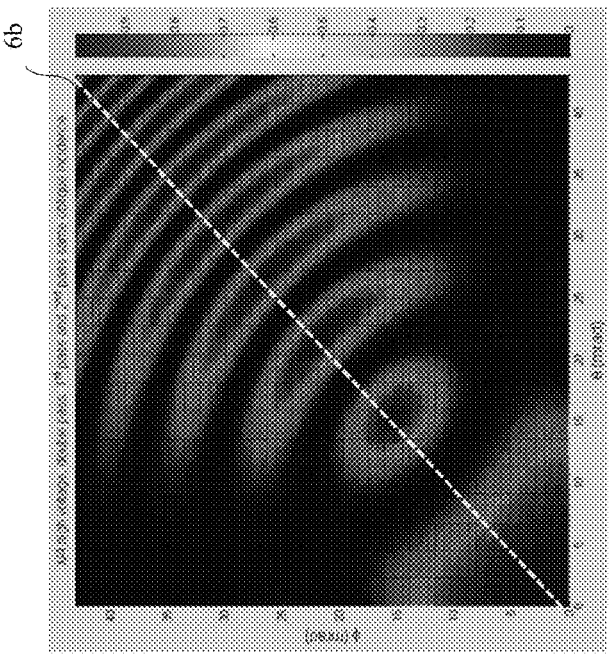
FIGS. 6A-6C show spectrum graphs of switching efficiencies versus angle $\theta$ and angle $\phi$ of the Pockels cell to each laser beam according to the double-pass EOM configuration 50 with a BBO Pockels cell.
Figure 6B:
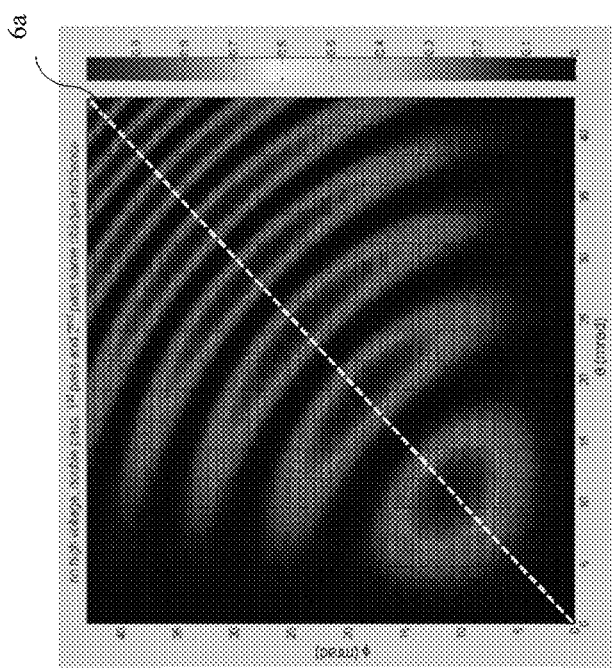

FIGS. 6A and 6B show spectrum graphs of switching efficiencies versus angle θ and angle φ of the Pockels cell to each laser beam according to the double-pass EOM configuration 50 with a BBO Pockels cell without a λ/4 high voltage (FIG. 6A) and with a λ/4 high voltage (FIG. 6B). Diagonal line 5a in FIGS. 5A and 5b in FIG. 5B represent the equal angle θ and angle φ(θ=φ).

As shown in FIGS. 6A and 6B, the first and the second angles are set to be not larger than approximately 43 mrad (~2.5°) for only simulation purpose; however, the angles are not limited thereto, and can be equal to or larger than 43 mrad in other implementations. The switching efficiency fluctuates repeatedly between 0 (0%) and 1 (100%) in the spectrum as the angle θ and angle φ changes from 0 mrad to 43 mrad, respectively.

Figure 6C:
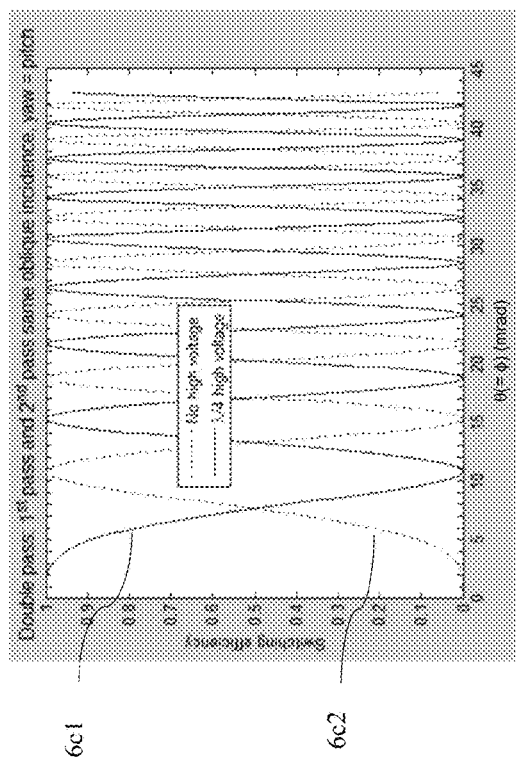

FIG. 6C shows a graph of switching efficiencies versus equal angle θ/angle φ(θ=φ) in the spectrum graphs in FIGS. 6A and 6B. Dash line 6c1 represents the switching efficiencies along diagonal line 6a in FIG. 6A, and solid line 6c2 represents the switching efficiencies along the diagonal line 6b in FIG. 6B.

Except for the zero angle between the beam paths, the equal angle θ/angle φ of Pockels cell to each laser beam that is applicable for pulse picking/Q-switching can be about but not limited to 15.3 mard, 21.6 mrad, 26.5 mrad, 30.5 mrad, 34.2 mard, 37.4 mrad, or 40.4 mrad, where the solid line 6c1 reaches 100% switching efficiency. Alternately, if the setup is the maximum switching efficiency (100%) without the λ/4 or λ/8 high voltage and minimum switching efficiency (0%) with no high voltage, the equal angle θ/angle φ can be but not limited to 10.8 mard, 18.7 mrad, 24.1 mrad, 28.6 mrad, 32.4 mard, 35.8 mrad, 38.9 mrad, or 41.8 mrad, where the dash line 6c2 reaches 100% switching efficiency.

Figures 7A, 7B:
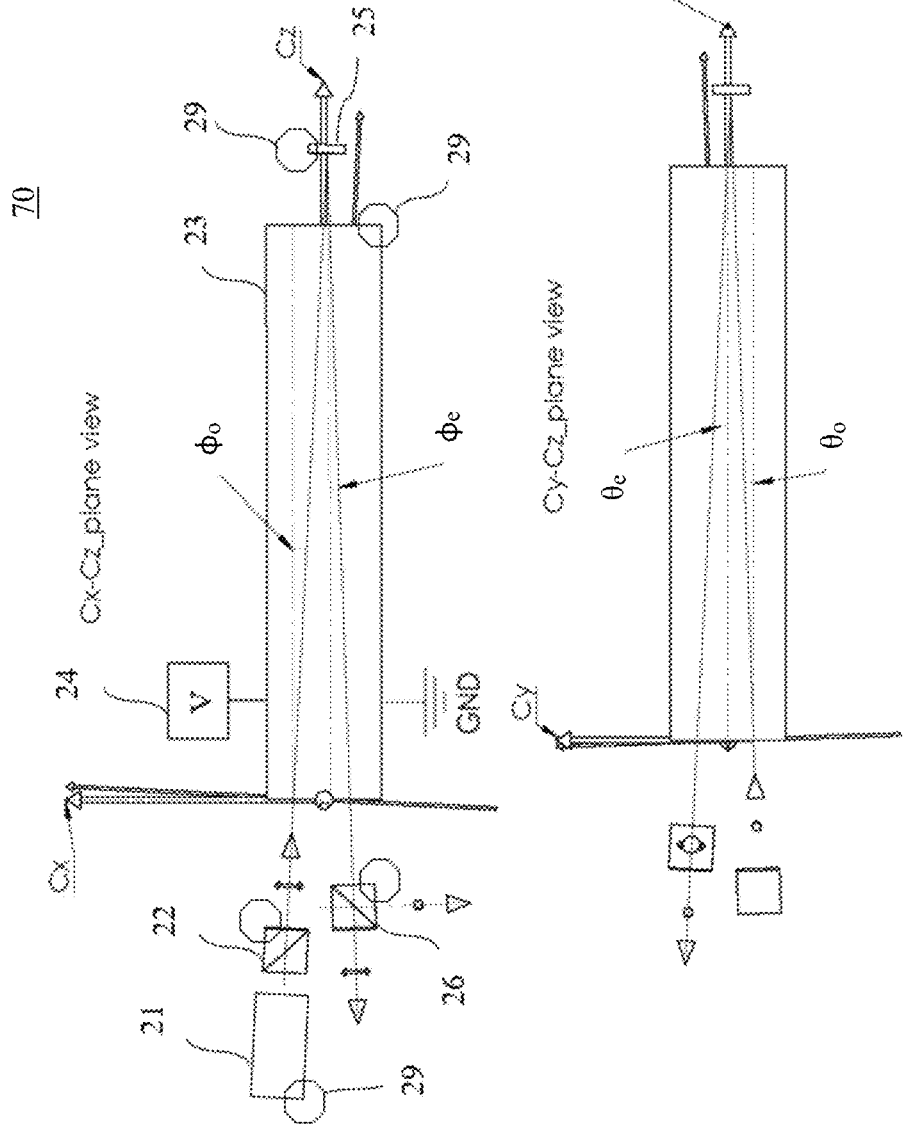
FIGS. 7A-7B are another schematic illustration of a double-pass EOM configuration 70 of the 2nd symmetric type according to one embodiment of the present disclosure. In this particular case, angle θ and angle φ have the following relations: φe=θo, and θe=φo.

FIGS. 7A-7B are another schematic illustration of double-pass EOM configuration 70 of the $2^{nd}$ symmetric type according to one embodiment of the present disclosure. FIGS. 7A and 7B are the Cx-Cz plane and Cy-Cz plane views of double-pass EOM configuration 70, respectively. The double-pass EOM configuration 70 is similar to the EOM configuration 50 illustrated in FIGS. 5A to 5B except that the angles of odd-pass beams and even-pass beams are swapped with the optical axis. Thus, a repetitive description is omitted and only a difference will be explained.

In this embodiment, the angles of the second-pass beams are swapped with the optical axis Cz. That is, the angle θ of the second-pass beam equals the angle φ of the first-pass beam, $\phi_e=\theta_o$ (rather than equaling the angle θ of the first-pass beam), while the angle θ of the first-pass beam equals the angle φ of the second-pass beam, $\phi_o=\theta_e$ (rather than equaling the angle θ of the second-pass beam).

In the Cx-Cz plane, the first-pass beam is slanted at the angle $\theta_o$ with respect to the optical axis Cz, and the second-pass beam is slanted at the angle $\theta_o$ with respect to the optical axis Cz, as shown in FIG. 7A.

In the Cy-Cz plane, the first-pass beam is slanted at the angle $\theta_o$ with respect to the optical axis Cz, and the second-pass beam is slanted at the angle $\phi_e$ with respect to the optical axis Cz on Cx-Cz, as shown in FIG. 7B.

FIGS. 8A-8B are yet another schematic illustration of double-pass EOM configuration 80 of the $3^{rd}$ symmetric type according to one embodiment of the present disclosure. FIGS. 8A and 8B are Cx-Cz plane and Cy-Cz plane views of double-pass EOM configuration 80, respectively. The double-pass EOM configuration 80 is similar to the EOM configuration 50. Thus, a repetitive description is omitted and only a difference will be explained.

In this embodiment, the first-pass beam and the second-pass beam are symmetric with respect to the optical axis Cz on Cx-Cz plane. In Cx-Cz plane, the first-pass beam and the second-pass beam are symmetric at the angle φ with respect to the optical axis Cz, as shown in FIG. 8A. In the Cy-Cz plane, the first-pass beam and the second-pass beam are slanted at the angle θ with respect to the optical axis Cz, as shown in FIG. 8B.

Figure 9A:
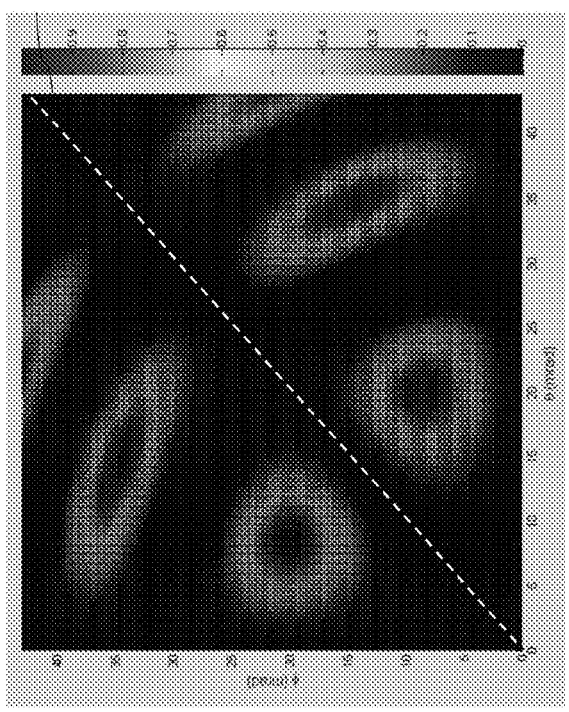
FIGS. 9A-9C show spectrum graphs of switching efficiencies versus angle θ and angle φ of a BBO Pockels cell to each laser beam according to the double-pass EOM configuration 80.
Figure 9B:
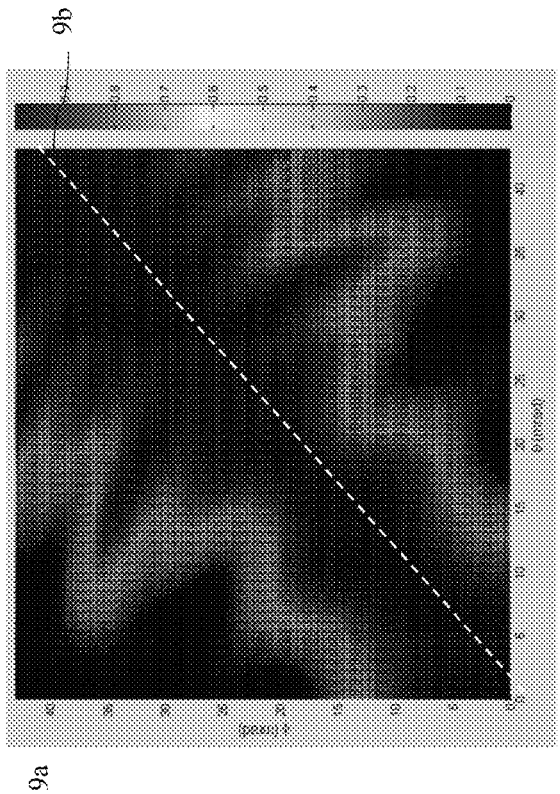

FIGS. 9A and 9B show spectrum graphs of switching efficiencies versus angle θ and angle φ of a BBO Pockels cell to each laser beam according to the double-pass EOM configuration 80 without a λ/4 or λ/8 high voltage (FIG. 9A) and with a λ/4 or λ/8 high voltage (FIG. 9B). Diagonal lines 9a, 9b in FIGS. 9A and 9B represent the equal angle θ and angle φ(θ=φ).

As shown in FIGS. 9A and 9B, the angle θ and angle φ are set to be not larger than approximately 43 mrad (~2.5°). The switching efficiency fluctuates repeatedly between 0 (0%) and 1 (100%) in the spectrum as the angle θ and angle φ change from 0 mrad to 43 mrad, respectively.

Figure 9C:
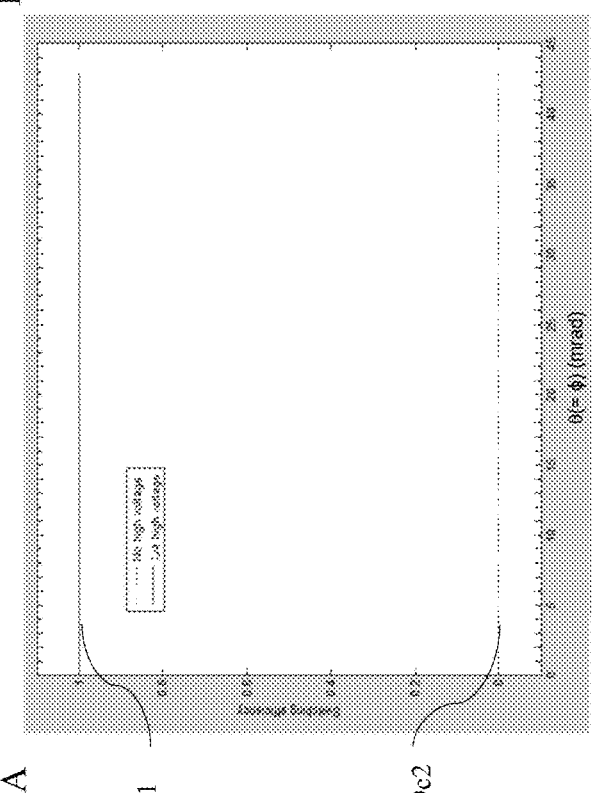

FIG. 9C shows a graph of switching efficiencies versus equal angle θ/angle φ(θ=φ) in the spectrum graphs in FIGS. 9A and 9B. Dash line 9c1 represents the switching efficiencies along diagonal line 9a in FIG. 9A, and solid line 9c2 represents the switching efficiencies along the diagonal line 9b in FIG. 9B.

Dash line 9c1 indicates that all of the equal angle θ/angle φ of Pockels cell to each laser beam with a λ/4 (half-wave) or λ/8 (quarter-wave) high voltage results in the maximum switching efficiency (100%), and all of the equal angle θ/angle φ of Pockels cell to each laser beam without a λ/4 or λ/8 high voltage results in minimum switching efficiency (0%).

FIGS. 10A-10B are yet another schematic illustration of double-pass EOM configuration 100 of the mix type according to one embodiment of the present disclosure. FIGS. 10A and 10B are Cx-Cz plane and Cy-Cz plane views of double-pass EOM configuration 100, respectively.

The double-pass EOM configuration 100 is similar to the EOM configuration 50 illustrated in FIGS. 5A to 5B except that at least one of the three laser beams deviate from the optical axis of Pockels cell. Thus, a repetitive description is omitted and only a difference will be explained.

In this amendment, the first-pass beam and the third-pass beam proceed along the optical axis Cz of the Pockels cell, and the second-pass beam is deviated from the optical axis Cz. In Cx-Cz plane, the first-pass beam and the third-pass beam proceed along the optical axis Cz of the Pockels cell, and the second-pass beam of the laser beam is slant at the angle ϕ with respect to the optical axis Cz, as shown in FIG. 10A. In Cy-Cz plane, the first-pass beam and the third-pass beam proceed along the optical axis Cz of the Pockels cell, and the second-pass beam of the laser beam is slant at the angle θ with respect to the optical axis Cz, as shown in FIG. 10B.

Figure 11A:
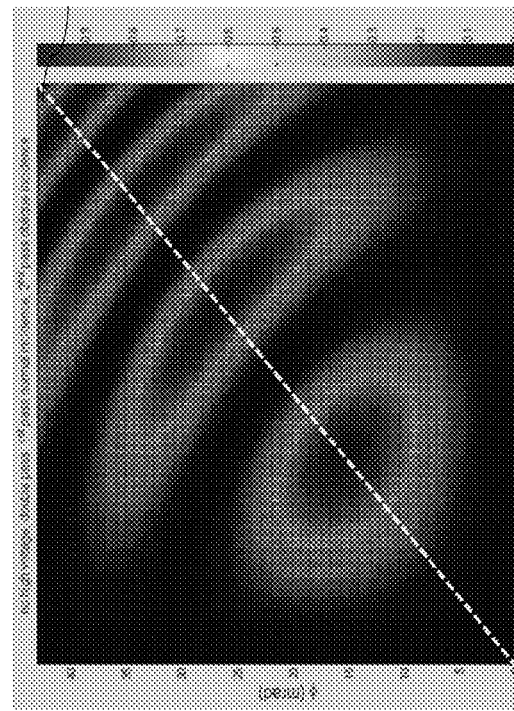
FIGS. 11A-11C show spectrum graphs of switching efficiencies versus angle θ and angle φ of the Pockels cell to the input laser beam for the double-pass BBO Pockels cell.
Figure 11B:
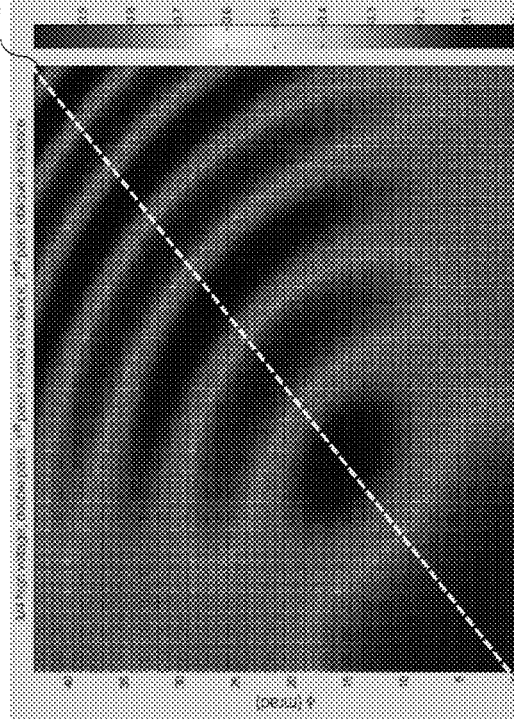
Figure 11C:
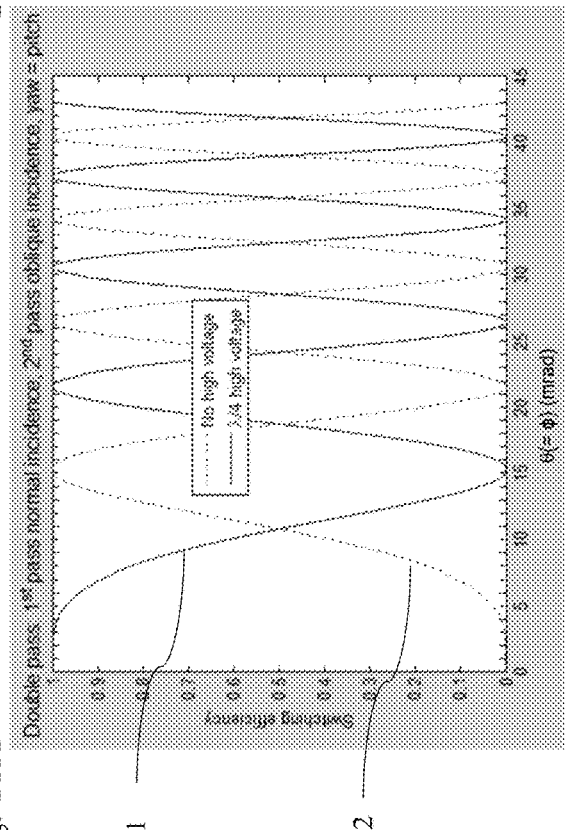

FIGS. 11A and 11B show spectrum graphs of switching efficiencies versus angle θ and angle ϕ of the Pockels cell to the input laser beam for the double-pass BBO Pockels cell without a λ/4 high voltage (FIG. 11A) and with a λ/4 high voltage (FIG. 11B) in the double-pass EOM configuration 10 illustrated in FIGS. 11A to 11C.

FIG. 11C shows a graph of switching efficiencies versus equal angle θ/angle ϕ in the double-pass EOM configuration 100. Solid line 11c1 represents the switching efficiencies along the diagonal line 1 1a in FIG. 11A, and dash line 11c2 represents the switching efficiencies along the diagonal line 11b in FIG. 11B.

The nonzero angle θ/angle ϕ of Pockels cell to the second-pass beam for pulse picking/switching can be about but not limited to 21.11 mrad, 30.5 mrad, or 37.4 mrad, where the solid line S2 reaches 100% switching efficiency. Alternately, the nonzero angle θ/angle ϕ of Pockels cell to the second-pass beam can be about but not limited to 15.3 mrad, 26.5 mrad, 34.2 mrad, or 40.4 mrad, where the dash line S2 reaches 100% switching efficiency.

Figure 12A:
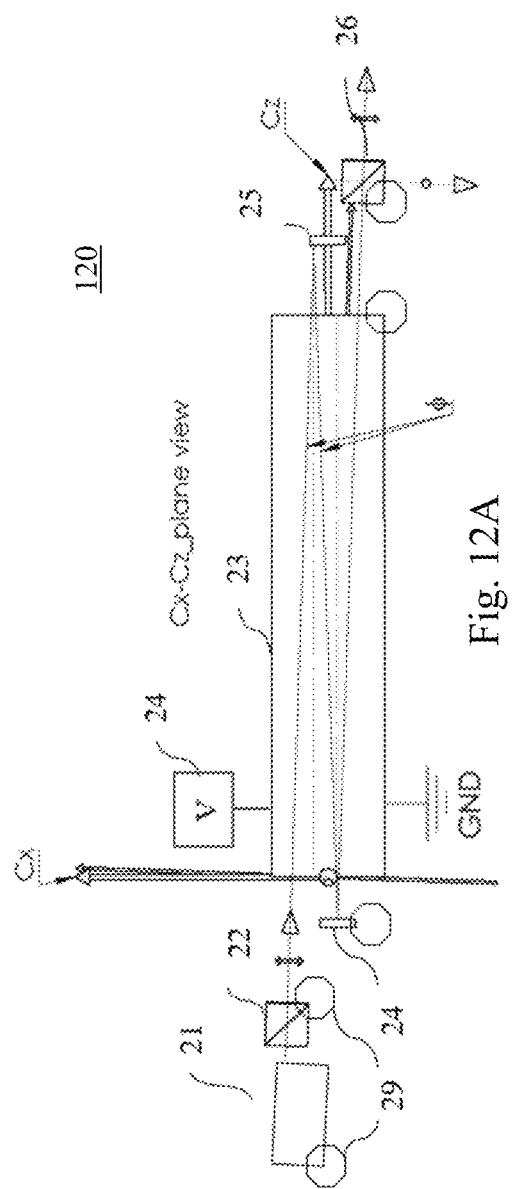
FIGS. 12A-12B are schematic illustrations of three-pass EOM configuration 120 of the 1st symmetric type according to one embodiment of the present disclosure.
Figure 12B:
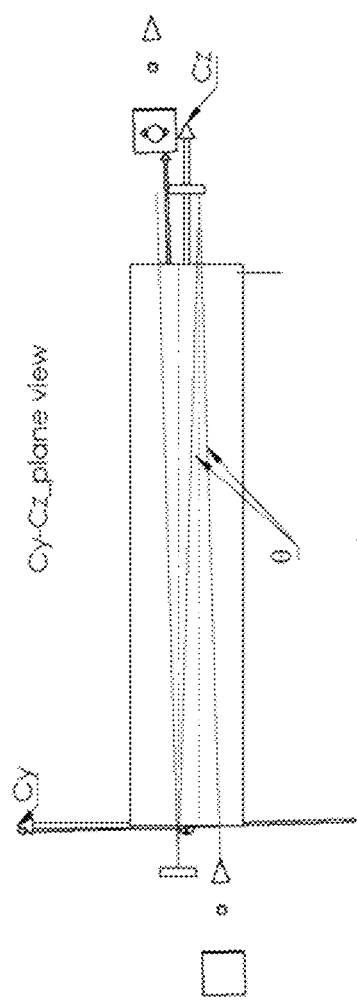

FIGS. 12A to 12B are schematic illustrations of three-pass EOM configuration 120 of the 1$^{st}$ symmetric type according to one embodiment of the present disclosure. FIGS. 12A and 12B are Cx-Cz plane and Cy-Cz plane views of three-pass EOM configuration 120, respectively.

As shown in FIGS. 12A to 12B, a laser beam that is polarized by PBS/TFP 22 enters Pockels cell 23 for the first-pass beam, and is reflected back to Pockels cell 23 by HR mirror 25 for the second-pass beam, which is sent back again by a second HR mirror to the Pockels cell for the third-pass beam. The third-pass laser beam continues to pass through a PBS/TFP 26 at the angle required by PBS/TFP 26.

The first-pass beam, the second-pass beam and the third-pass beam are slanted at the same angle with the optical axis Cz, and the first-pass beam and the third-pass beam are symmetric each other with the optical axis Cz on the Cx-Cz plane.

In Cx-Cz plane, the first-pass beam and the third-pass beam are slant at the angle ϕ with respect to the optical axis Cz of the Pockels cell, and the second-pass beam of the laser beam is slant at the angle θ with respect to the optical axis Cz, as shown in FIG. 12A.

In Cy-Cz plane, the first-pass beam and the third-pass beam are slant at the angle θ with respect to the optical axis Cz of the Pockels cell, and the second-pass beam of the laser beam is slant at the angle ϕ with respect to the optical axis Cz, as shown in FIG. 12B.

Power supplier 24 applies λ/6 (half-wave) or λ/12 (quarter-wave) high voltage to Pockels cell 23, and the laser polarization is changed by 90° degree to be along vertical/horizontal direction, and the laser pulse is reflected by/transmits through PBS/TFP 26. When the λ/6 or λ/12 high voltage is removed, the laser beam maintains the original polarization, and the laser pulse transmits through/is reflected by the PBS/TFP 26.

Figure 13:
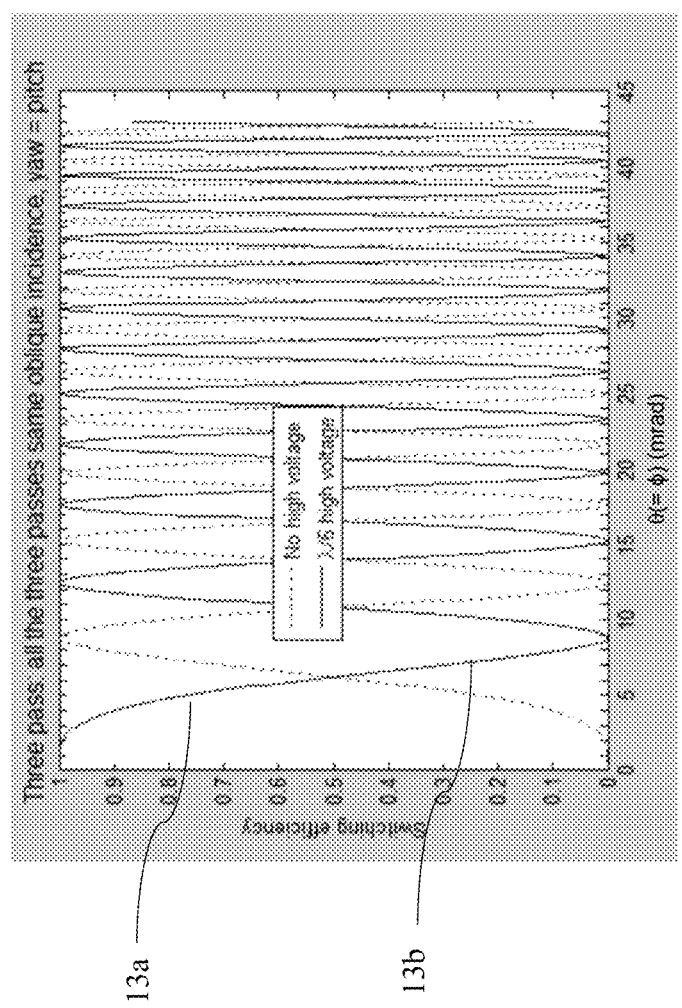
FIG. 13 is a graph of switching efficiencies versus equal angle θ/angle φ in the three-pass BBO Pockels cell when all the three-pass laser beams are slanted at the same angle (angle θ=φ) with respect to the optical axis of Pockels cell.

FIG. 13 is a graph of switching efficiencies versus equal angle θ/angle ϕ in the three-pass BBO Pockels cell when all the three-pass laser beams are slanted at the same angle (angle θ and angle ϕ) with respect to the optical axis of Pockels cell according to three-pass EOM configuration 120.

The equal angle θ/angle ϕ of the Pockels cell axis to each laser beam that is applicable for pulse picking/Q-switching can be about but not limited to 12.5 mard, 17.6 mrad, 21.6 mrad, 24.9 mrad, 27.9 mrad, 30.5 mrad, 33 mard, 35.3 mrad, 37.4 mrad, 39.4 mrad, or 41.4 mrad, where the solid line S4 reaches 100% switching efficiency. Alternately, the equal angle θ/angle ϕ of the Pockels cell axis to each laser beam path can be about but not limited to 8.8 mrad, 15.3 mrad, 19.7 mrad, 23.3 mrad, 26.5 mrad, 29.2 mrad, 31.8 mrad, 34.2 mrad, 36.4 mrad, 40.4 mrad, 42.3 mrad, where the dash line D4 reaches 100% switching efficiency.

FIGS. 14A-14B are yet another schematic illustration of three-pass EOM configuration 140 of the 2$^{nd}$ symmetric type according to one embodiment of the present disclosure. FIGS. 14A and 14B are Cx-Cz plane and Cy-Cz plane views of three-pass EOM configuration 140, respectively.

The three-pass EOM configuration 140 is similar to the EOM configuration 120 illustrated in FIGS. 12A to 12C except that the angles of odd-pass beams and even-pass beams are swapped with the optical axis. Thus, a repetitive description is omitted and only a difference will be explained.

In this embodiment, the angles of the first-pass beam and the third-pass beam and the angle of the second-pass beam are swapped with the optical axis Cz. That is, the angle θ of the second-pass beam equals the angle ϕ of the first-pass and the third-pass beams, $ϕ_e$=00, while the angle θ of the first-pass and third-pass beams equal the angle ϕ of the second-pass beam, $ϕ_o=θ_e$.

In Cx-Cz plane, the first-pass beam and the third-pass beam are slant at the angle $θ_o$ with respect to the optical axis Cz of the Pockels cell, and the second-pass beam of the laser beam is slant at the angle $ϕ_e$ with respect to the optical axis Cz, as shown in FIG. 14A.

In Cy-Cz plane, the first-pass beam and the third-pass beam are slant at the angle $θ_o$ with respect to the optical axis Cz of the Pockels cell, and the second-pass beam of the laser beam is slant at the angle $θ_e$ with respect to the optical axis Cz, as shown in FIG. 14B.

Figure 15A:
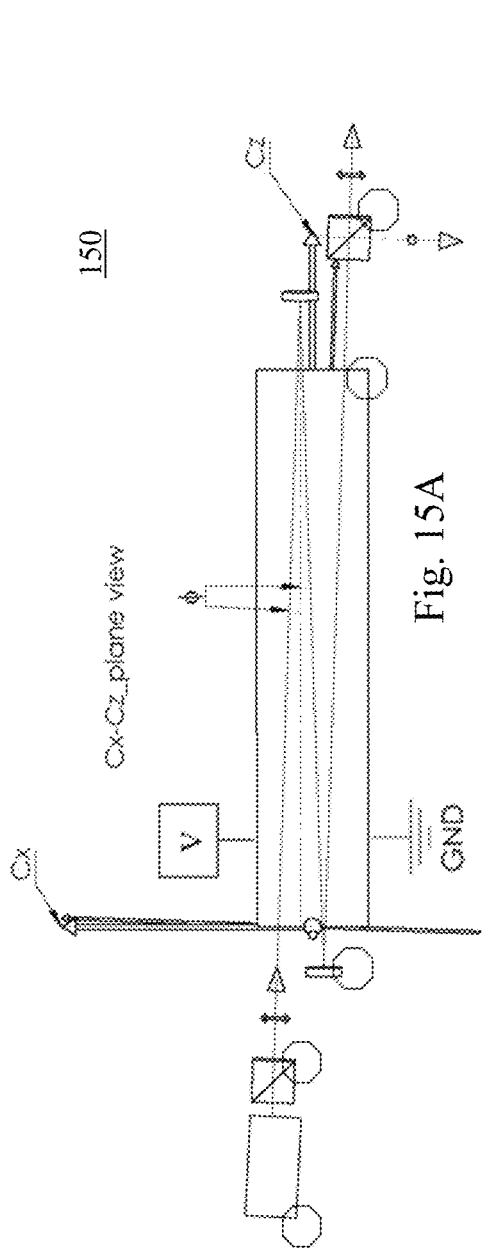
FIGS. 15A-15B are yet another schematic illustration of three-pass EOM configuration 150 of the $3^{rd}$ symmetric type according to one embodiment of the present disclosure.
Figure 15B:
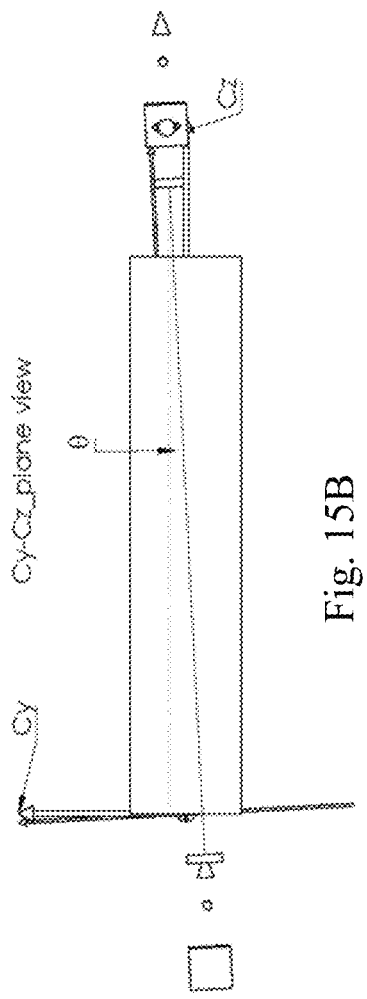

FIGS. 15A-15B are yet another schematic illustration of three-pass EOM configuration 150 of the 3$^{rd}$ symmetric type according to one embodiment of the present disclosure. FIGS. 15A and 15B are Cx-Cz plane and Cy-Cz plane views of three-pass EOM configuration 150, respectively.

The three-pass EOM configuration 150 is similar to the above three-pass EOM configuration 110 except that the odd-pass and even-pass beams are symmetric with the pitch plane of Pockels cell. Thus, a repetitive description is omitted and only a difference will be explained.

In this embodiment, the first-pass beam, the second-pass beam and the third-pass beam are symmetric with the pitch plane (i.e., Cy-Cz plane) of Pockels cell. In Cx-Cz plane, the first-pass beam, the second-pass beam and the third-pass beam are slanted at angle θ with respect to the optical axis Cz, as shown in FIG. 15A. In Cy-Cz plane, the first-pass beam, the second-pass beam and the third-pass beam are slanted at angle ϕ with respect to the optical axis Cz, as shown in FIG. 15B.

FIGS. 16A-16B are yet another schematic illustration of three-pass EOM configuration 160 of the mix type according to one embodiment of the present disclosure. FIGS. 16A and 16B are Cx-Cz plane and Cy-Cz plane views of three-pass EOM configuration 160, respectively.

The three-pass EOM configuration 160 is similar to the EOM configuration 120 illustrated in FIGS. 12A to 12B except that at least one of the three laser beams deviate from the optical axis of Pockels cell. Thus, a repetitive description is omitted and only a difference will be explained.

In this embodiment, the first-pass beam and the third-pass beam proceed along and the second-pass beam of the laser beam deviates from the optical axis of Pockels cell 23.

In Cx-Cz plane, the first-pass beam and the third-pass beam proceed along the optical axis Cz of the Pockels cell, and the second-pass beam of the laser beam is slant at the angle $\phi$ with respect to the optical axis Cz, as shown in FIG. 16A.

In Cy-Cz plane, the first-pass beam and the third-pass beam proceed along the optical axis Cz of the Pockels cell, and the second-pass beam of the laser beam is slant at the angle $\theta$ with respect to the optical axis Cz, as shown in FIG. 16B.

Figure 17:
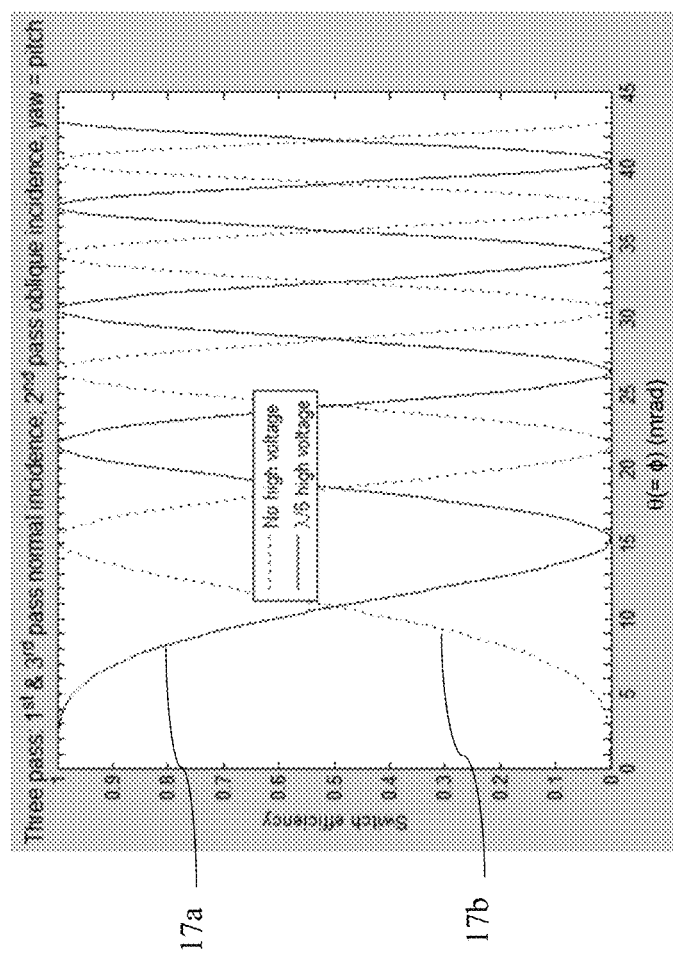
FIG. 17 shows a graph of switching efficiencies versus angle θ/angle φ of the BBO Pockels cell axis to the second-pass laser beam for the three-pass EOM configuration.
Figure 18:
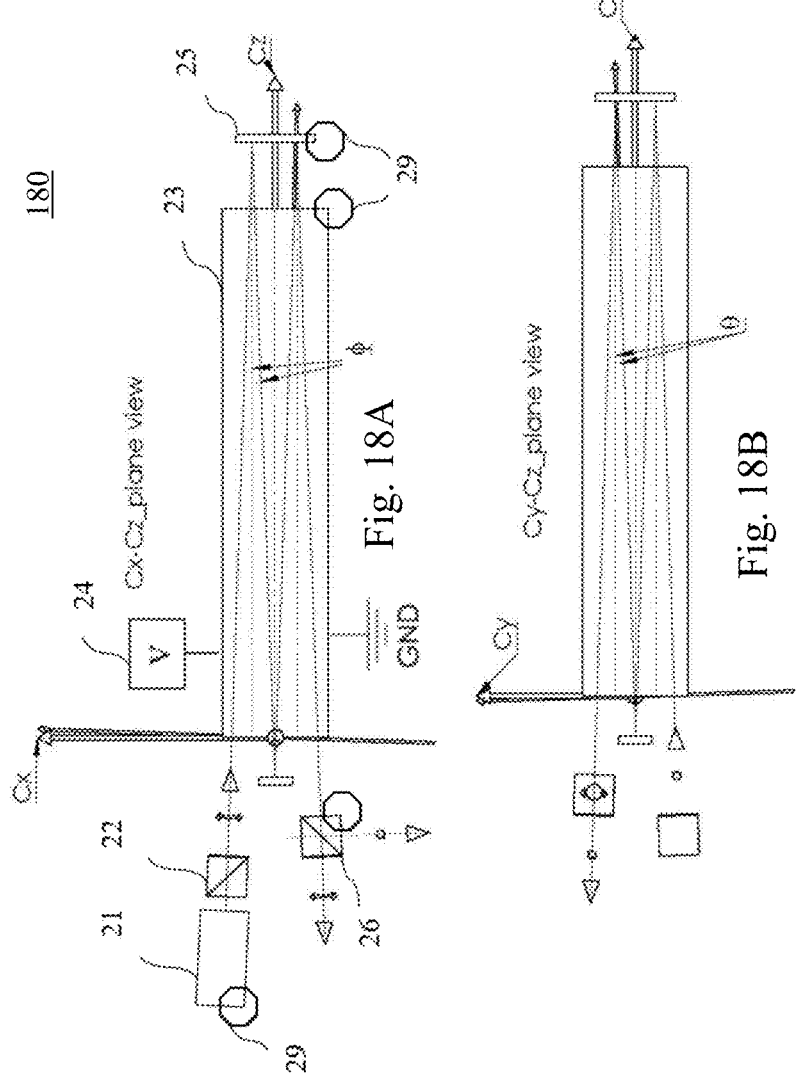
FIGS. 18A-18B are schematic illustrations of four-pass EOM configuration 180 of the 1st symmetric type according to one embodiment of the present disclosure.

FIG. 17 shows a graph of switching efficiencies versus angle $\theta$/angle $\phi$ of the BBO Pockels cell axis to the second-pass laser beam for the above three-pass EOM configuration 160 when the first and third beam passes are along the optical axis direction, the second beam pass deviates from the optical axis. The nonzero angle $\theta$/angle $\phi$ of the Pockels cell axis to the second-pass beam can be about but not limited to 21.6 mrad, 30.5 mrad, or 37.4 mrad, where the solid line 16a reaches 1.0 (100%) switching efficiency.

Alternately, the equal angle $\theta$/angle $\phi$ of the Pockels cell axis to the second beam can be about but not limited to 15.3 mrad, 26.5 mrad, 34.2 mrad, or 40.4 mrad, where the dash line 16b reaches 1.0 (100%) switching efficiency.

FIGS. 18A to 18B are schematic illustrations of four-pass EOM configuration 180 of the 1$^{st}$ symmetric type according to one embodiment of the present disclosure. FIG. 18C is Cy-Cz plane views of fourpass EOM configuration 180, respectively.

As shown in FIGS. 18A to 18B, a horizontal or vertical polarized laser beam enters Pockels cell 23 for the first-pass beam, and then is reflected back to Pockels cell 23 for the second-pass beam by a first HR mirror 25. The laser beam is sent back by a second HR mirror 26 to Pockels cell 23 for the third-beam pass, and the laser is sent back by the first HR mirror 25 again to Pockels cell 23 for the fourth-beam pass. The fourth-pass laser beam continues to pass through PBS/TFP 26.

In this embodiment, all the first-pass beam to the fourth-pass beam are symmetric with respect to the optical axis Cz. The first-pass beam to the fourth-pass beam pass are slanted at the angle $\phi$ with respect to the optical axis Cz on the Cx-Cz plane, as illustrated in FIG. 18A. Also, the first-pass beam to the fourth-pass beam pass are slanted at the angle $\theta$ with respect to the optical axis Cy on Cy-Cz plane, as illustrated in FIG. 18B.

Pockels cell 23 is adjusted along the yaw and pitch directions to accomplish a desired switching efficiency, and power supplier 24 applies $\lambda/8$ (half-wave) or $\lambda/16$ (quarter-wave) high voltage to Pockels cell 23 while the laser beam passes through Pocket cell four times. Through the four-time passing process, the laser polarization is changed by 90° degree to be along a vertical or horizontal direction. Subsequently, the laser beam is reflected by PBS/TFP 26 or passes through PBS/TFP 26. If the $\lambda/8$ or $\lambda/16$ high voltage is removed, the laser maintains the original polarization, and the laser pulse transmits through/is reflected by the PBS/TFP 26.

In one embodiment, if the Pockels cell is based on a gyrotropic crystal with an optical activity, a half-wave or quarter-wave plate is inserted into the four-pass beams to compensate the polarization rotation introduced by the EO crystal.

The angle between the four beams may be large enough, and the first HR mirror diameter is small enough, such that no laser will be blocked by the HR mirrors 25, 26. The angle $\theta$/angle $\phi$ of the Pockels cell 23 may be determined to accomplish the maximum switching efficiency.

Figure 19:
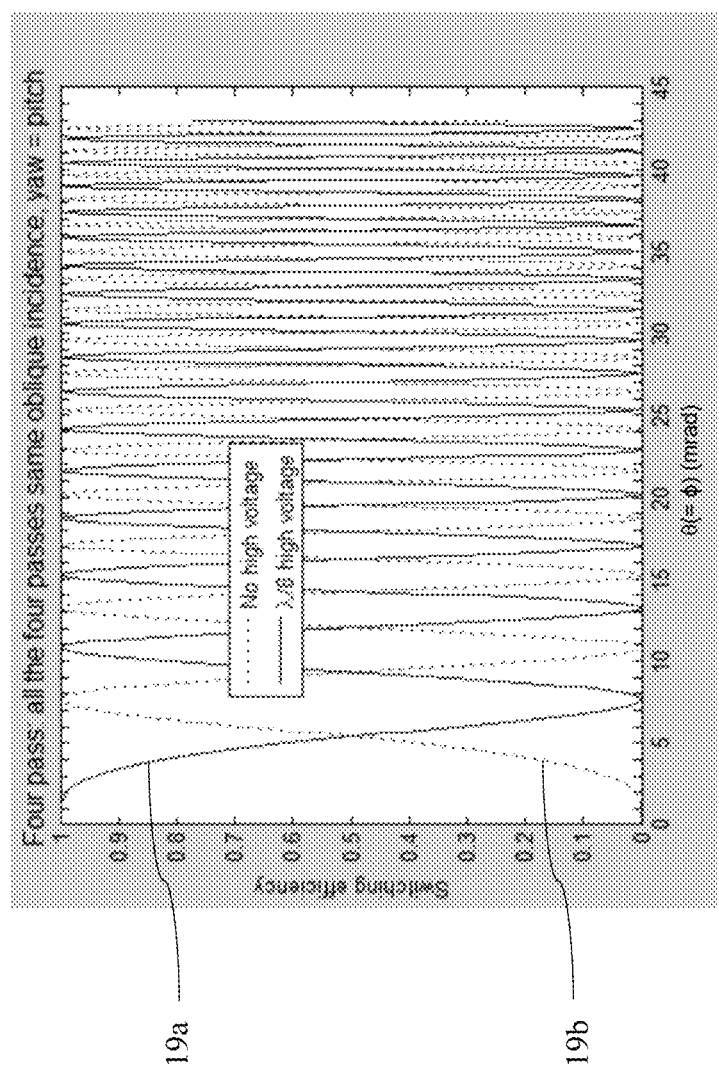
FIG. 19 shows an example of a spectrum graph of switching efficiencies versus angle θ/angle φ of Pockels cell axis to each laser beam in four-pass EOM configuration.

FIG. 19 shows an example of a spectrum graph of switching efficiencies versus angle $\theta$/angle $\phi$ of Pockels cell axis to each laser beam in four-pass EOM configuration 180 illustrated in FIGS. 18A to 18B using KD*P and BBO Pockels cell when all the four laser beam paths are slanted at the same angle with respect to the optical axis of Pockels cell 23 in Cx-Cz and Cy-Cz planes.

The nonzero angle $\theta$/angle $\phi$ of the Pockels cell axis to each laser beam path that is applicable for pulse picking/Q-switching can be about but not limited to 10.8 mard, 15.3 mrad, 18.7 mrad, 21.6 mrad, 24.1 mrad, 26.5 mrad, 28.6 mard, 30.5 mrad, 32.4 mrad, 34.2 mrad, 35.8 mrad, 37.4 mrad, 38.9 mrad, 40.4 mrad, or 41.8 mrad, where the solid line 19a reaches 100% switching efficiency. Alternately, the equal angle $\theta$/angle $\phi$ ($\theta=\phi$) of the Pockels cell axis to each laser beam path can be about but not limited to 7.6 mrad, 13.2 mrad, 17.1 mrad, 20.2 mrad, 22.9 mrad, 25.3 mrad, 27.5 mrad, 29.6 mrad, 31.5 mrad, 33.3 mrad, 35 mrad, 36.6 mrad, 38.2 mrad, 39.7 mrad, 41.1 mrad, or 42.5 mrad, where the dash line 19b reaches 100% switching efficiency.

Figures 20A, 20B:
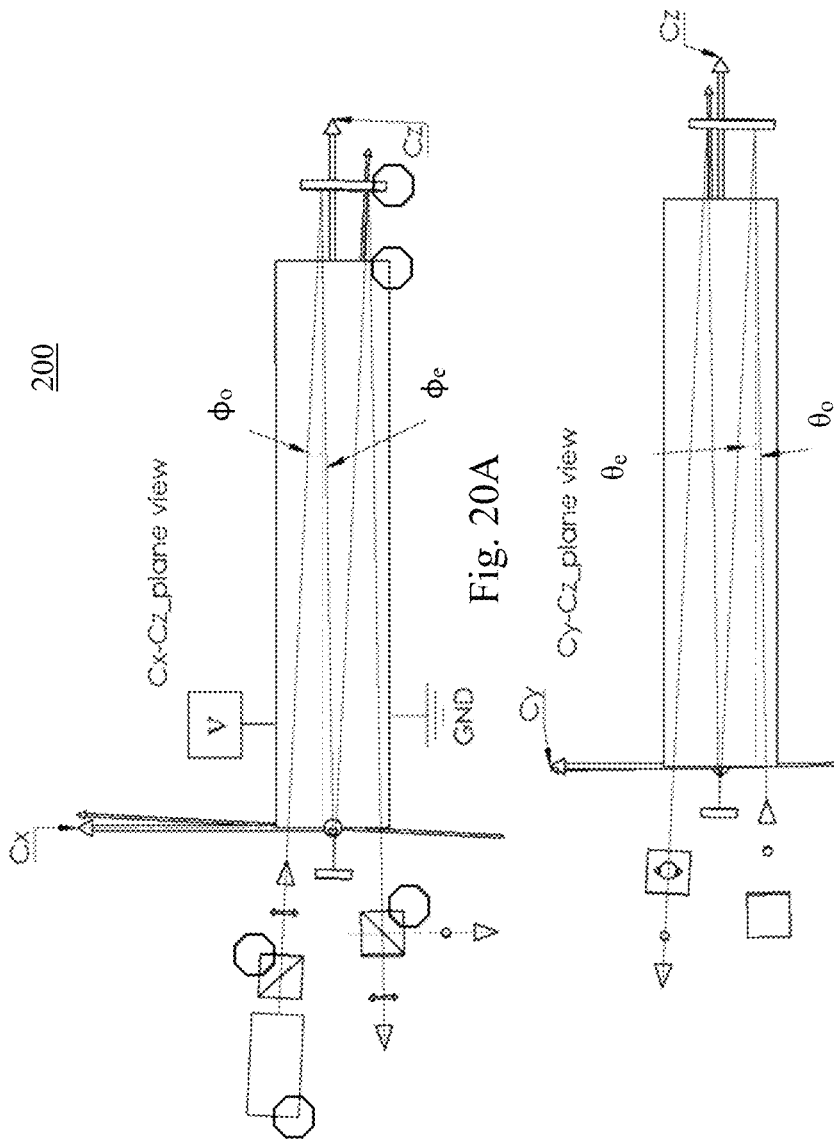
FIGS. 20A-20B are another schematic illustration of four-pass EOM configuration 200 of the 2nd symmetric type according to one embodiment of the present disclosure. In this particular case, angle θ and angle φ have the following relations: φe=θo, and θe=φo.

FIGS. 20A-20B are another schematic illustration of four-pass EOM configuration 200 of the 2$^{nd}$ symmetric type according to one embodiment of the present disclosure. FIGS. 20A and 20B are Cx-Cz plane and Cy-Cz plane views of four-pass EOM configuration 200, respectively. The four-pass EOM configuration 200 is similar to the EOM configuration 180 except that the angles of odd-pass beams and the angles of even-pass beams are swapped with the optical axis of the Pockels cell. Thus, a repetitive description is omitted and only a difference will be explained.

In this embodiment, the angles of the first-pass beam and the third-pass beams and the angles of the second-pass beam and the fourth-pass beam are swapped with the optical axis Cz. That is, the angle $\theta$ of the second-pass and the fourth-pass beams equal the angle $\phi$ of the first-pass and the third-pass beams, $\phi_e=\theta_o$, while the angle $\theta$ of the first-pass and third-pass beams equal the angle $\phi$ of the second-pass and the fourth-pass beams, $\phi_o=\theta_e$.

In the Cy-Cz plane, the first-pass beam and the third-pass beam are slanted at the angle $\theta_o$ with respect to the optical axis Cz, and the second-pass beam and the fourth-pass beam are slanted at the angle $\theta_e$ with respect to the optical axis Cz, as shown in FIG. 20B.

FIGS. 21A-21B are another schematic illustration of four-pass EOM configuration 210 according to one embodiment of the present disclosure. FIGS. 21A and 21B are Cx-Cz plane and Cy-Cz plane views of four-pass EOM configuration 210, respectively. The four-pass EOM configuration 210 is similar to the EOM configuration 180 except that the odd-pass and even-pass beams are symmetric with the pitch plane of Pockels cell. Thus, a repetitive description is omitted and only a difference will be explained.

In this embodiment, the first-pass beam, the second-pass beam, the third-pass beam and the fourth-beam are symmetric with the pitch plane (i.e., Cy-Cz plane) of Pockels cell.

In the Cx-Cz plane, the first-pass beam, the second-pass beam, the third-pass beam and the fourth-beam are slanted at angle θ with respect to the optical axis Cz, as shown in FIG. 21A.

In the Cx-Cz plane, the first-pass beam, the second-pass beam, the third-pass beam and the fourth-beam are slanted at the angle φ with respect to the optical axis Cz on Cx-Cz plane, as shown in FIG. 21B.

FIGS. 22A-22B are another schematic illustration of four-pass EOM configuration 220 according to one embodiment of the present disclosure. FIGS. 22A and 22B are Cx-Cz plane and Cy-Cz plane views of four-pass EOM configuration 220, respectively. The four-pass EOM configuration 220 is similar to the EOM configuration 180 except that two of the three laser beams deviate from the optical axis of Pockels cell. Thus, a repetitive description is omitted and only a difference will be explained.

In this embodiment, the first-pass beam and the third-pass beam proceed along the optical axis Cz of the Pockels cell, and the second-pass beam and the fourth beam are deviated from the optical axis Cz.

In the Cx-Cz plane, the first-pass beam and the third-pass beam proceed along the optical axis Cz of the Pockels cell, and the second-pass beam and the fourth-pass beam of the laser beam are slant at the angle φ with respect to the optical axis Cz, as shown in FIG. 22A.

In the Cy-Cz plane, the first-pass beam and the third-pass beam proceed along the optical axis Cz of the Pockels cell, and the second-pass beam and the fourth-pass beam of the laser beam are slant at the angle θ with respect to the optical axis Cz, as shown in FIG. 22B.

Figure 23:
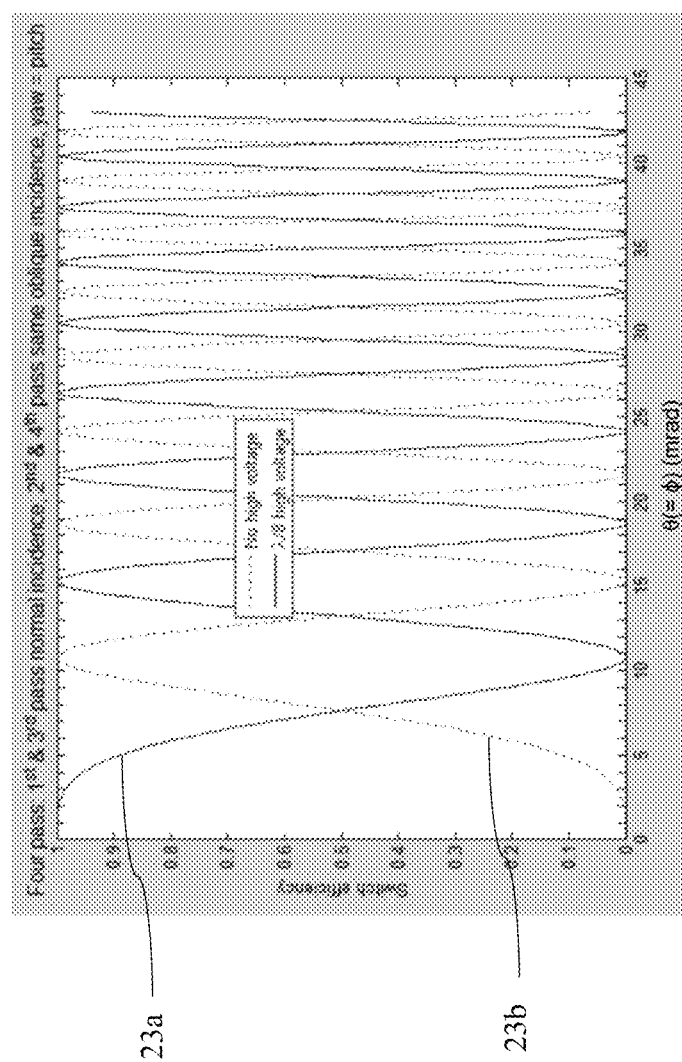
FIG. 23 shows a spectrum graph of switching efficiencies versus angle θ/angle φ of Pockels cell axis with respect to the second-pass beam or the fourth-pass beam in four-pass EOM configuration.

FIG. 23 shows a spectrum graph of switching efficiencies versus angle θ/angle φ of Pockels cell with respect to the second-pass beam or the fourth-pass beam in four-pass EOM configuration using KD*P and BBO Pockels cell when the first and third pass laser beams are along optical axis and second and fourth pass laser beams deviate at the same angles from the optical axis in Cx-Cz and Cy-Cz plane.

The nonzero angle θ/angle φ of the Pockels cell axis to the second-pass beam can be about but not limited to 15.3 mrad, 21.6 mrad, 26.5 mrad, 30.5 mrad, 34.2 mrad, 37.4 mrad, or 40.4 mrad, where the solid line 23a reaches 100% switching efficiency. Alternately, the equal angle θ/angle φ (θ=φ) of the Pockels cell axis to the second-pass beam can be about but not limited to 10.8 mrad, 18.7 mrad, 24.2 mrad, 28.6 mrad, 32.4 mrad, 35.8 mrad, 38.9 mrad, or 41.8 mrad, where the dash line 23b reaches 100% switching efficiency.

Figures 24A, 24B:
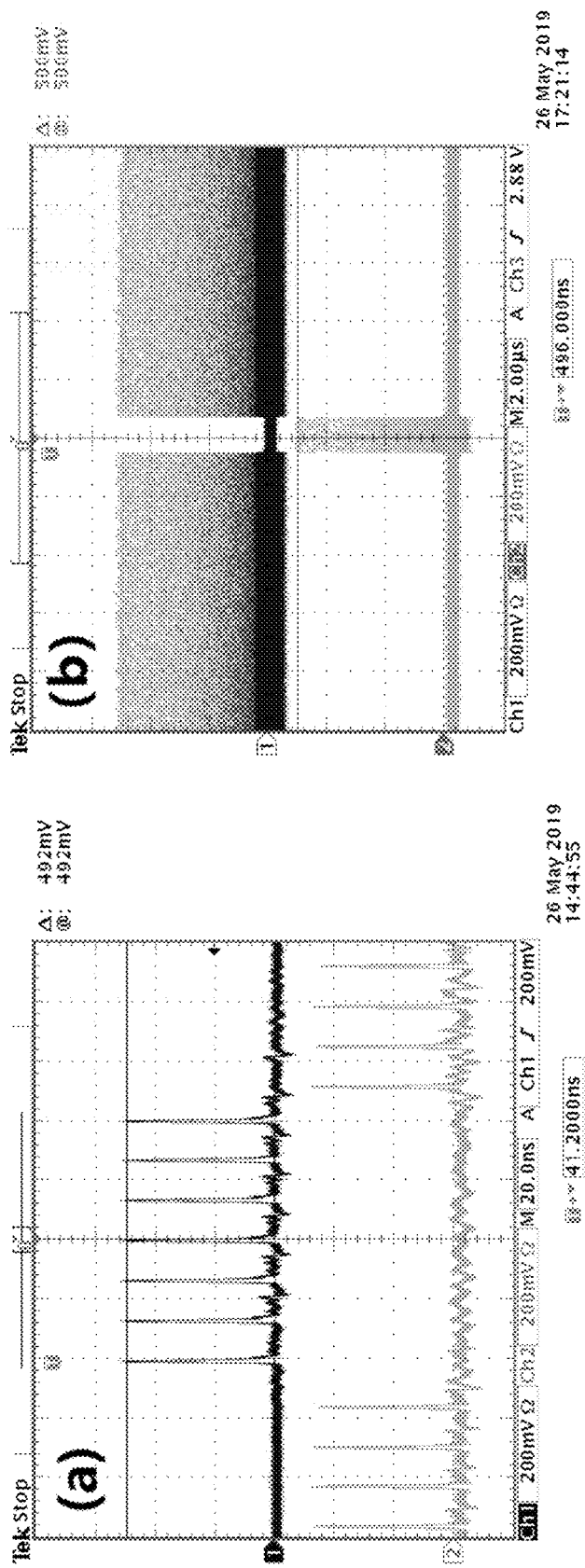
FIG. 24A shows an example of pulse picking/Q-switching experiment results with four-pass EOM configuration using KD*P Pockels cell.
FIG. 24B shows an example of pulse picking/Q-switching experiment results with four-pass EOM configuration using BBO Pockels cell.

FIG. 24A shows an example of pulse picking/Q-switching experiment results with four-pass EOM configuration using KD*P Pockels cell, and FIG. 24B shows an example of pulse picking/Q-switching experiment results with four-pass EOM configuration using BBO Pockels cell.

Figure 25A:
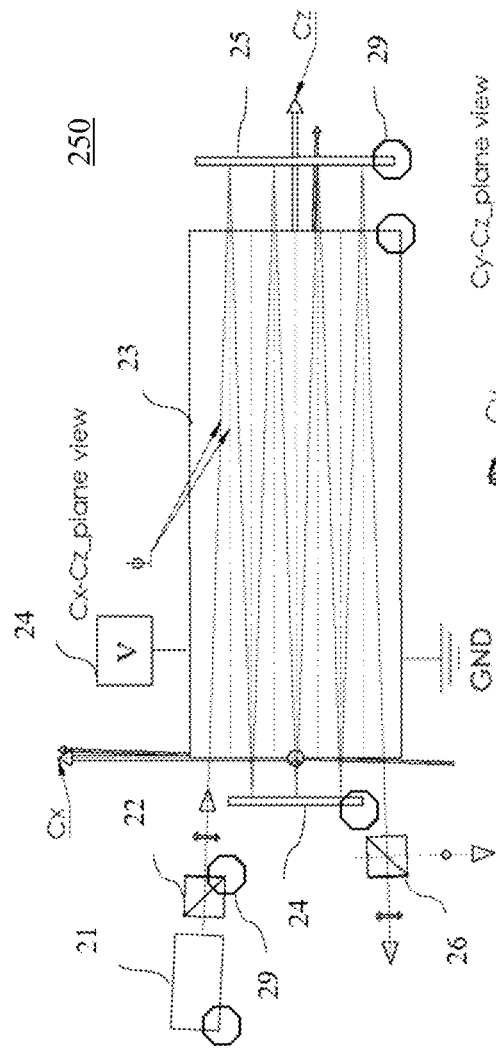
FIGS. 25A-25B are schematic illustrations of eight-pass EOM configuration of the 1st symmetric type according to one embodiment of the present disclosure.
Figure 25B:
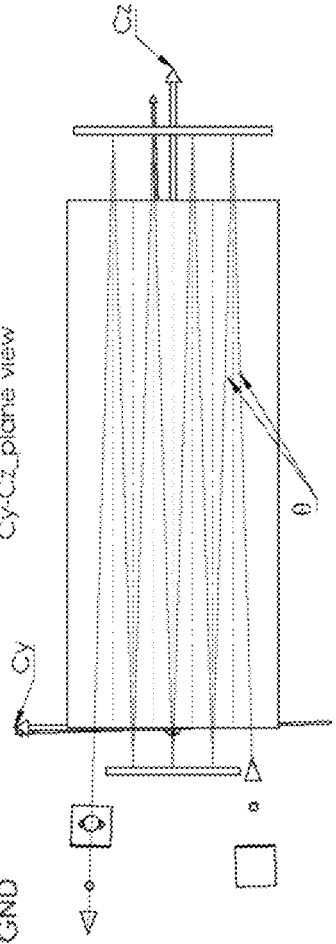

FIGS. 25A to 25B are schematic illustrations of eight-pass EOM configuration 250 of the 1$^{st}$ symmetric type according to one embodiment of the present disclosure. FIGS. 25A and 25B are Cx-Cz plane and Cy-Cz plane views of eight-pass EOM configuration 250, respectively.

In the embodiment, the first-pass beam to the eighth-pass beam are symmetric with respect to the optical axis Cz. The first-pass beam to the eighth-pass beam pass are slanted at the angle φ with respect to the optical axis Cz on the Cx-Cz plane, as illustrated in FIG. 25A. Also, the first-pass beam and the eighth-pass beam pass are slanted at the angle θ with respect to the optical axis Cz on Cy-Cz plane, as illustrated in FIG. 25B.

As shown in FIGS. 25A to 25B, a laser beam that is polarized by PBS/TFP 22 enters Pockels cell 23, and is reflected back to Pockels cell by HR mirror 25 for the second-pass beam, and then is reflected back by HR mirror 26 for the third-pass beam, and the reflections are repeated between HR mirror 25 and HR mirror 26 for the fourth-pass beam, the fifth-pass beam, the sixth-pass beam, the seven-pass beam and the eighth-pass beam. The eighth-pass beam continues to pass through a PBS/TFP 26.

Pockels cell 23 is adjusted along the yaw direction and/or the pitch direction to accomplish a desired switching efficiency, and power supplier 24 applies λ/16 (half-wave) or λ/32 (quarter-wave) voltage to Pockels cell 23 while the laser beam passes through Pocket cell eight times. Through the eight-time passing process, the laser polarization is changed by 90° degree to be along a vertical or horizontal direction. Subsequently, the laser beam is reflected by PBS/TFP or passes through PBS/TFP 26. If the λ/16 or λ/32 voltage is removed, the laser maintains the original polarization, and the laser pulse transmits through/is reflected by the PBS/TFP.

Depending on the setup in the implemented applications, it can be also the inverse case that no polarization change with a λ/16 or λ/32 voltage while 90° polarization change, instead of the high voltage. The angle between the beam paths needs to be large enough, and the first HR mirror diameter needs to be small enough, such that no laser will be blocked by the HR mirror. The angles that satisfy for pulse picking/Q-switching are those where switching efficiency is 0%/100% for no voltage and 100%/0% for λ/16 or λ/32 voltage at the same time.

The switching efficiency for an eight-pass BBO Pockels cell in the first angle method is calculated versus the angle of the optical axis of the Pockels cell to the laser beam under the condition of no voltage and λ/16 (half-wave) or λ/32 (quarter-wave) voltage when all the eight passes are slanted at the same angle with respect to the optical axis in the x-y plane.

FIGS. 26A and 26B show respective spectrum graphs of switching efficiencies versus angle θ and angle φ of Pockels cell axis to laser beam for eight-pass EOM configuration 250 using BBO Pockels cell with a λ/16 voltage (FIG. 26A) or without a λ/16 voltage (FIG. 26B) when all the eight passes have the same angle to the optical axis.

FIG. 26C shows a calculation result graph of switching efficiencies versus yaw/pitch angle of Pockels cell axis to laser beam for eight-pass EOM configuration 250 using BBO Pockels cell under the condition of equal yaw and angle φ. In other words, the all pass beams are slanted at the same angle with respect to the optical axis in the x-y plane. Dash line 26c1 represents the switching efficiencies along the diagonal line 26a in FIG. 26A, and solid line 26c2 represents the switching efficiencies along the diagonal line 26b in FIG. 26B. The equal angle θ/angle φ reaching 100% switching efficiency can be used for pulse picking/Q-switching.

FIGS. 27A-27B are another schematic illustration of an eight-pass EOM configuration 270 of the 2$^{nd}$ symmetric type according to one embodiment of the present disclosure. FIGS. 27A and 27B are Cx-Cz plane and Cy-Cz plane views of eight-pass EOM configuration 270, respectively. The eight-pass EOM configuration 270 is similar to the EOM configuration 210 except that the angles of odd-pass beams and even-pass beams are swapped with the optical axis. Thus, a repetitive description is omitted and only a difference will be explained.

In this embodiment, the first-pass beam to the eighth-pass beam are swapped with the optical axis Cz. That is, the angle θ of the even-pass beams equal the angle φ of the odd-pass beams, $\phi_e=\theta_o$, while the angle θ of the odd-pass beams equal the angle φ of the even-pass beams, $\phi_o=\theta_e$.

In the Cx-Cz plane, the first-pass beam, the third-pass beam, the fifth-pass beam, the seventh-pass beam are slanted at the angle $\theta_o$ with respect to the optical axis Cz on Cx-Cz, and the second-pass beam, the fourth-pass beam, the sixth-pass beam, and the eighth-pass beam are slanted at the angle $\phi_e$ with respect to the optical axis Cz, as shown in FIG. 27A.

In the Cy-Cz plane, the first-pass beam, the third-pass beam, the fifth-pass beam, the seventh-pass beam are slanted at the angle $\theta_o$ with respect to the optical axis Cz on Cx-Cz, and the second-pass beam, the fourth-pass beam, the sixth-pass beam, and the eighth-pass beam are slanted at the angle $\phi_e$ with respect to the optical axis Cz, as shown in FIG. 27B.

FIGS. 28A-28B are another schematic illustration of an eight-pass EOM configuration 280 of the 3$^{rd}$ symmetric type according to one embodiment of the present disclosure. FIGS. 23A and 23B are Cx-Cz plane and Cy-Cz plane views of eight-pass EOM configuration 230, respectively. The eight-pass EOM configuration 280 is similar to the EOM configuration 210 except that the even-pass beams and the odd-pass beams are symmetric with the pitch plane of Pockels cell. Thus, a repetitive description is omitted and only a difference will be explained.

In this embodiment, the first-pass beam to the eighth-pass beam are symmetric with the pitch plane (i.e., Cy-Cz plane) of Pockels cell.

In the Cx-Cz plane, the even-pass beams are slanted at the angle φ with respect to the optical axis Cz on Cx-Cz, and the odd-pass beam are slanted at the angle θ with respect to the optical axis Cz, as shown in FIG. 28A.

In the Cy-Cz plane, the even-pass beam is slanted at the angle θ with respect to the optical axis Cz, and the odd-pass beam is slanted at the angle φ with respect to the optical axis Cz on Cx-Cz, as shown in FIG. 28B.

Figure 29A:
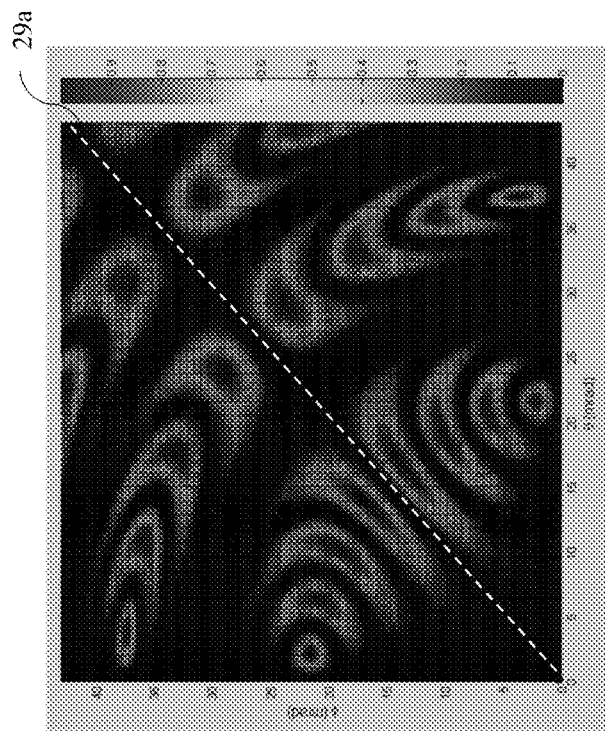
FIGS. 29A-29C show spectrum graphs of switching efficiencies versus angle θ and angle φ of the Pockels cell to each laser beam according to the eight-pass EOM configuration.
Figure 29B:
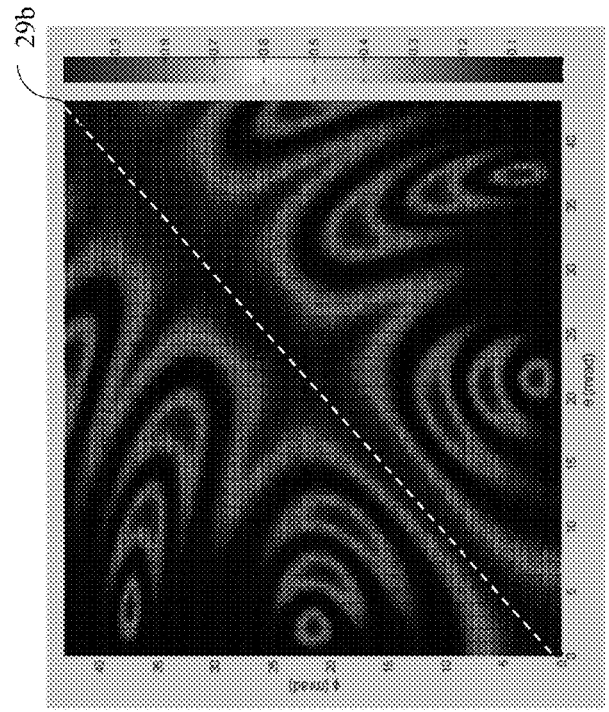

FIGS. 29A and 29B show spectrum graphs of switching efficiencies versus angle θ/angle φ of the Pockels cell to each laser beam according to the eight-pass EOM configuration 280 having a BBO Pockels cell without a λ/4 high voltage (FIG. 29A) and with a λ/4 voltage (FIG. 29B). Diagonal lines 29a, 29b in FIGS. 29A and 29B represent the equal θ and φ(θ=φ).

As shown in FIGS. 29A and 29B, the angle θ and angle φ are set to be not larger than approximately 43 mrad)(~2.5°. The switching efficiency fluctuates repeatedly between 0 (0%) and 1 (100%) in the spectrum as the angle θ and angle φ change from 0 mrad to 43 mrad, respectively.

Figure 29C:
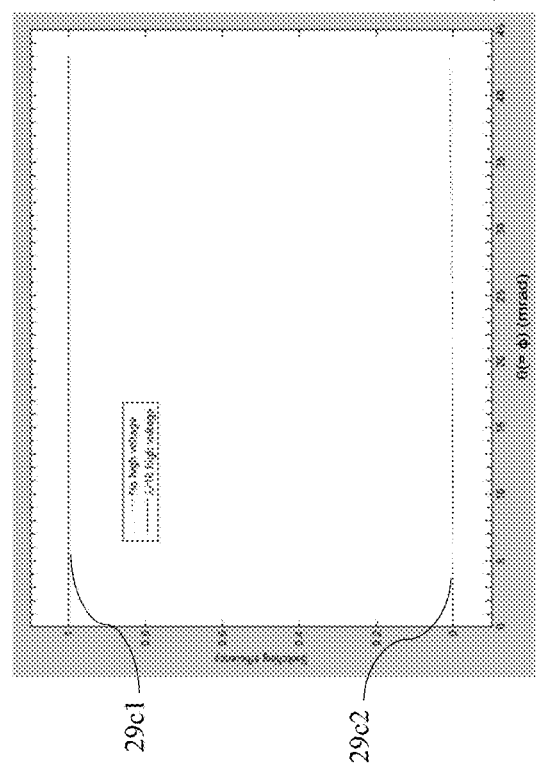

FIG. 29C shows a graph of switching efficiencies versus equal angle θ/angle φ in the spectrum graphs in FIGS. 29A and 29B. Dash line 29c1 represents the switching efficiencies along diagonal line 29a in FIG. 29A, and solid line 29c2 represents the switching efficiencies along the diagonal line 29b in FIG. 29B.

Dash line 29c1 indicates that all of the equal angle θ/angle φ of Pockels cell to each laser beam with a λ/4 high voltage results in the maximum switching efficiency (100%). Solid line 29c2 indicates that the equal angle θ/angle φ of Pockels cell to each laser beam without a λ/4 high voltage results in minimum switching efficiency (0%).

FIGS. 30A-30B are yet another schematic illustration of eighth-pass EOM configuration 300 of the mix type according to one embodiment of the present disclosure. FIGS. 30A and 30B are Cx-Cz plane and Cy-Cz plane views of eighth-pass EOM configuration 300, respectively.

The eighth-pass EOM configuration 300 is similar to the EOM configuration 250 illustrated in FIGS. 25A to 25C except that at least one of the eight laser beams deviate from the optical axis of Pockels cell. Thus, a repetitive description is omitted and only a difference will be explained.

In Cx-Cz plane, the first-pass beam, the third-pass beam, the fifth-pass beam, and the seventh-pass beam proceed along the optical axis Cz of the Pockels cell, and the second-pass beam, the fourth-pass, the sixth-pass, and the eighth-pass of the laser beam are slant at the angle φ with respect to the optical axis Cz, as shown in FIG. 30A.

In Cy-Cz plane, the first-pass beam, the third-pass beam, the fifth-pass beam, and the seventh-pass beam proceed along the optical axis Cz of the Pockels cell, and the second-pass beam, the fourth-pass, the sixth-pass, and the eighth-pass are slant at the angle θ with respect to the optical axis Cz, as shown in FIG. 30B.

Figure 31A:
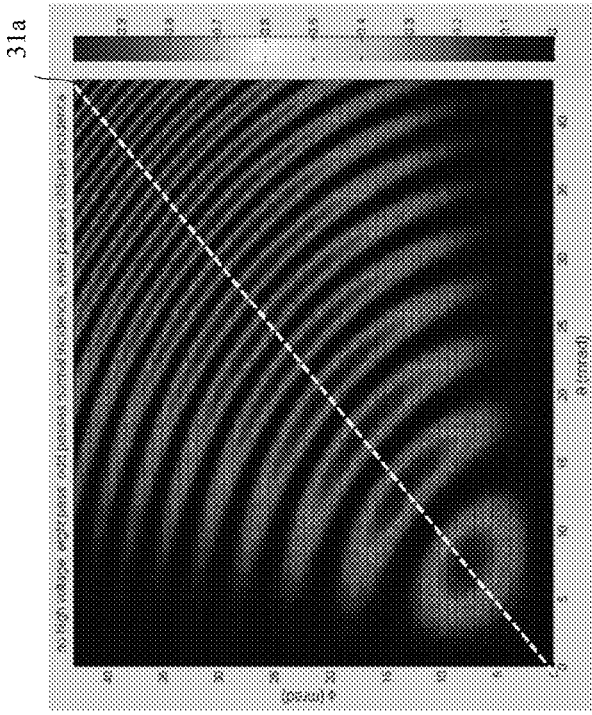
FIGS. 31A-31C show respective spectrum graphs of switching efficiencies versus angle θ and angle φ of Pockels cell axis to laser beam for eight-pass EOM configuration 300.
Figure 31B:
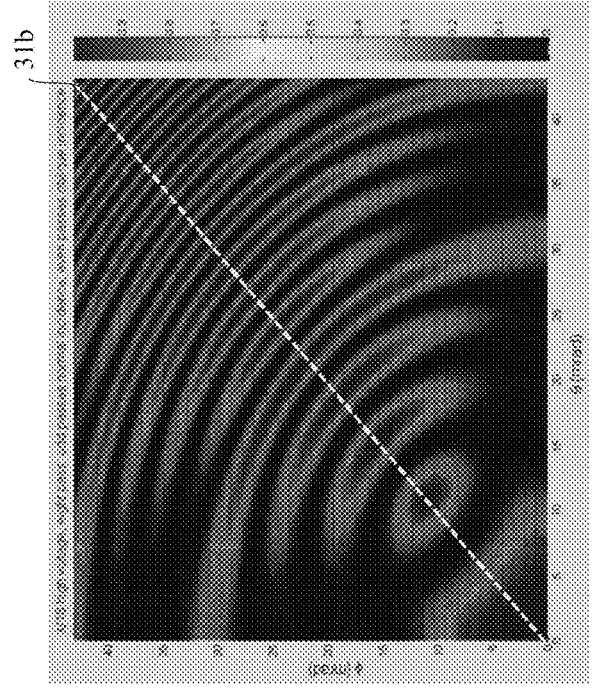

FIGS. 31A and 31B show respective spectrum graphs of switching efficiencies versus angle θ and angle φ of Pockels cell axis to laser beam for eight-pass EOM configuration 300 using a BBO Pockels cell with a λ/16 or λ/32 high voltage (FIG. 31A) or without a λ/16 or λ/32 high voltage (FIG. 31B) when the odd laser beam passes are along the optical axis of Pockels cell and the even-pass beams deviate from the optical axis of Pockels cell.

Figure 31C:
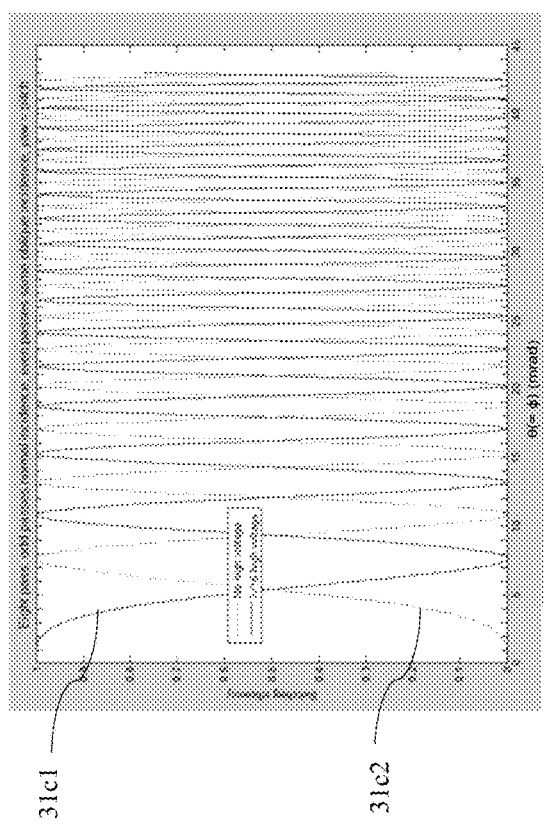

FIG. 31C shows a calculation result graph of switching efficiencies versus angle θ/angle φ of Pockels cell axis to laser beam for eight-pass eight-pass EOM configuration 300 using the BBO Pockels cell under the condition of equal yaw and pitch angle. Dash line D9 represents the switching efficiencies along the diagonal line d8 in FIG. 31A, and solid line S9 represents the switching efficiencies along the diagonal line d9 in FIG. 31B. The angle θ/angle φ reach 100% switching efficiency can be used for pulse picking/Q-switching.

Figure 32:
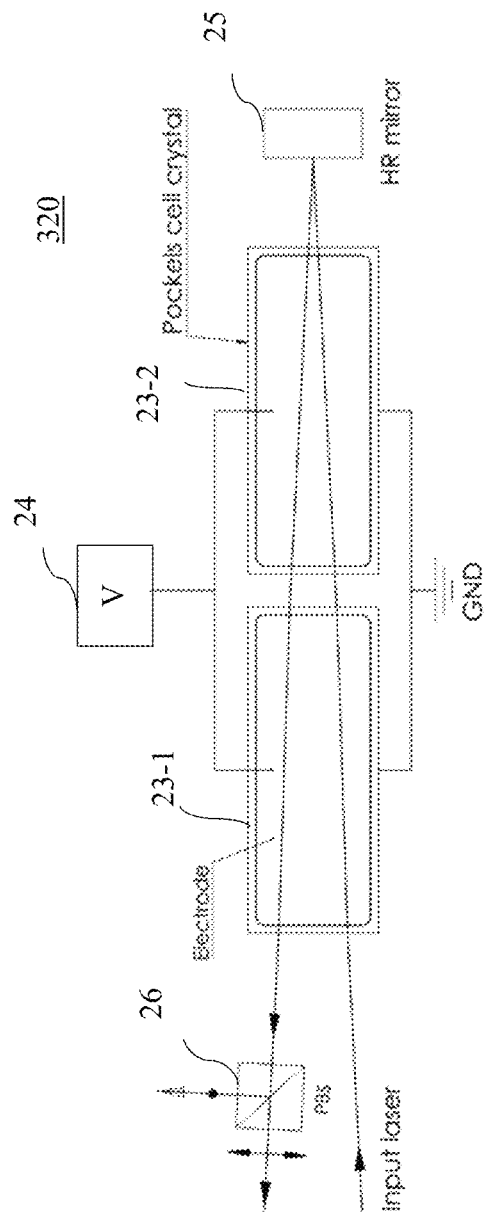
FIG. 32 illustrates an example of a double-pass EOM configuration with multiple Pockels cells according to one embodiment of the present disclosure.

FIG. 32 illustrates an example of a double-pass EOM configuration with multiple Pockels cells according to one embodiment of the present disclosure.

The double-pass EOM configuration 320 is similar to the double-pass EOM configuration 50 illustrated in FIGS. 5A to 5B except that double Pockels cells are used instead of a single Pockel cell. Also, the required high power to each of the double Pokel cells 22a, 22b is reduced from a λ/4 voltage to a λ/8 high voltage in case of a half-wave voltage.

In one embodiment, the multiple-pass EOM configuration may include a plurality of Pocket cells. When the EOM configuration with N time-pass includes the M number of Pockels cells, the required voltage to be applied to each of M Pockels cells is reduced to λ/2M*N high voltage.

The multiple-pass EOM configuration with M Pockels cells may be combined with the above angle methods described herein.

The laser beam passes through the Pockels cell crystal many times along directions deviated from the optical axis of the crystal, no extra optical isolator nor a half-wave or quarter-wave plate but only commonly used reflective mirrors are needed, the layout is very simple and compact, compared with the acousto-optic modulator (AOM). In this configuration, this disclosure does not need a long beam path to separate the selected laser beam from unselected laser beam. Also, because of the reduced voltage applied on the Pockels cell, the piezoelectricity ringing effect, which is usually troublesome, is also weakened.

This present disclosure also has the advantage of fast and almost 100% pulse picking/Q-switching efficiency. Overall, the present disclosure provides multiple-pass EOM solutions to enable fast, cheap, simple, compact and high-efficiency laser pulse picking/Q-switching.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A laser apparatus with a multi-pass configuration, comprising:
    an electro-optic (EO) medium through which a polarized laser beam passes;
    at least one reflection mirror configured to reflect the polarized laser beam so that the polarized laser beam passes through the EO medium for N times, forming a plurality of first-pass to Nth-pass beams, an optical axis of the EO medium being tilted with respect to at least one of the plurality of first-pass to Nth-pass beams; and
    a power supply configured to alternatingly provide a 1/N of a half-wave or quarter-wave voltage and remove the 1/N of the half-wave or quarter-wave voltage to the EO medium, $\lambda$ being the wavelength of the polarized laser beam.

2. The laser apparatus according to claim 1, wherein
    the optical axis of the EO medium is tilted at a first angle on a first plane and/or a second angle on a second plane with respect to the at least one of the plurality of first-pass to Nth-pass beams.

3. The laser apparatus according to claim 1, wherein
    one of the EO medium or the at least one reflection mirror is tilted in multiple directions.

4. The laser apparatus according to claim 1, wherein
    the plurality of first-pass to Nth-pass beams are slanted at angles of a same magnitude with respect to an optical axis of the EO medium.

5. The laser apparatus according to claim 4, wherein
    the plurality of first-pass to Nth-pass beams are slanted at a first angle of a same magnitude on a first plane and at a second angle of another same magnitude on a second plane with respect to an optical axis of the EO medium.

6. The laser apparatus according to claim 1, wherein
    the plurality of first-pass to Nth-pass beams are slanted with respect to an optical axis of the EO medium such that angles of odd-pass beams in a first plane have a same magnitude as angles of even-pass beams in a second plane and angles of even-pass beams in the first plane have a same magnitude as angles of odd-pass beams in the second plane.

7. The laser apparatus according to claim 6, wherein
    an odd-pass beam is slanted at a first angle with respect to the optical axis on the first plane with respect to the optical axis of the EO medium, and an even-pass beam is slanted at a second angle on the second plane with respect to the optical axis of the EO medium.

8. The laser apparatus according to claim 1, wherein
    even-pass beams and odd-pass beams are symmetric to each other with respect to a pitch plane of the optical axis of the EO medium.

9. The laser apparatus according to claim 1, wherein
    even-pass beams and odd-pass beams are symmetric to each other with respect to a yaw plane of the optical axis of the EO medium.

10. The laser apparatus according to claim 1, wherein
    even-pass beams are along with respect to the optical axis of the EO medium, and odd-pass beams deviate with respect to the optical axis of the EO medium, or
    even-pass beams deviate with respect to the optical axis of the EO medium, and odd-pass beams are along with respect to the optical axis of the EO medium.

11. The laser apparatus according to claim 1, wherein
    the polarized laser beam that passed the EO medium for the N times is reflected by a polarizing beam splitter or passes through a thin film polarizer.

12. The laser apparatus according to claim 1, wherein
    the EO medium comprises a M number of Pockels cells, and
    the power supplier is configured to alternately provide a 1/M*N of a half-wave ($\lambda/2$) or quarter-wave ($\lambda/4$) voltage and remove the 1/M*N of the half-wave ($\lambda/2$) or quarter-wave ($\lambda/4$) voltage to each of the M number of Pockels cells.

13. The laser apparatus according to claim 1, wherein
    the N times is two times,
    the polarized laser beam enters the EO medium and passes through the EO medium for a first-pass beam, and
    the first-pass beam is reflected back to the EO medium by the at least one reflection mirror and passes through the EO medium for a second-pass beam.

14. The laser apparatus according to claim 1, wherein
    the N times is three times,
    the at least one mirror include a first mirror and a second mirror, and
    the power supplier is configured to alternately provide a $\lambda/6$ voltage and no voltage to the EO medium,
    wherein the laser beam enters the EO medium and passes through the EO medium for a first-pass beam,
    the first-pass beam is reflected back to the EO medium by the first mirror and passes through Pockels cell for a second-pass beam, and
    the second-pass beam is reflected back to the EO medium by the at least one mirror and passes through Pockels cell for a third-pass beam.

15. The laser apparatus according to claim 1, wherein
    the N times is four times, and
    the power supplier is configured to alternatingly provide a $\lambda/8$ of the half-wave voltage and remove the $\lambda/8$ of the half-wave voltage to the EO medium.

16. The laser apparatus according to claim 1, wherein
    the N times is eight times, and
    the power supplier is configured to alternately provide a $\lambda/16$ of the half-wave voltage and remove the $\lambda/16$ of the half-wave voltage to the EO medium.

17. The laser apparatus according to claim 1, wherein the power supplier is configured to provide the 1/N of a half-wave voltage with a tolerance of up to 10 percent.

18. A method for operating a laser apparatus comprising:
    entering a polarized laser beam to an electro-optic (EO) medium;
    reflecting, by at least one reflector, the polarized laser beam so that the beam passes through the EO medium for N times, forming a plurality of first-pass to Nth-pass beams, an optical axis of the EO medium being tilted with respect to at least one of the plurality of first-pass to Nth-pass beams; and
    alternatingly providing, by a power supplier, a 1/N of a half-wave voltage ($\lambda/2N$) and removing the $\lambda/2N$ voltage to the EO medium, $\lambda$ being a wavelength of the polarized laser beam.

19. The method according to claim 18, further comprising:
tilting one of the EO medium, or the at least one reflection mirror with respect to the at least one of the plurality of first-pass to Nth-pass beams in a yaw direction and/or a pitch direction.

20. The laser apparatus according to claim 1, wherein the half-wave voltage is $\lambda/2$ voltage, $\lambda$ being a wavelength of the polarized laser beam.

21. The laser apparatus according to claim 1, wherein the EO medium is made of one of various crystals with electro-optical properties, the various crystals including BBO (Beta Barium Borate), RTP (Rubidium Titanyl Phosphate), KTP (Potassium Titanyl Phosphate), KD*P (Potassium dideuterium phosphate), KDP (Potassium dihydrogen phosphate) and $LiNbO_3$ (Lithium niobate) crystal.

22. The laser apparatus according to claim 1, further comprising a laser polarizer configured to output the polarized laser beam.

23. The laser apparatus according to claim 1, wherein the laser apparatus is placed outside a laser cavity as an electro-optic pulse picker and modulator.

24. The laser apparatus according to claim 1, wherein the laser apparatus is placed in a laser cavity as an electro-optic Q switch.

* * * * *